US008191050B2

(12) United States Patent
Iizuka

(10) Patent No.: US 8,191,050 B2
(45) Date of Patent: May 29, 2012

(54) INFORMATION PROCESSOR, CONTROL METHOD THEREFOR, COMPUTER PROGRAM AND STORAGE MEDIUM

(75) Inventor: Toshiaki Iizuka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1537 days.

(21) Appl. No.: 11/277,864

(22) Filed: Mar. 29, 2006

(65) Prior Publication Data

US 2006/0221364 A1 Oct. 5, 2006

(30) Foreign Application Priority Data

Apr. 1, 2005 (JP) ................................. 2005-106800

(51) Int. Cl.
*G06F 9/44* (2006.01)
*G06K 15/00* (2006.01)
*H04N 1/40* (2006.01)

(52) U.S. Cl. ......... 717/128; 717/127; 717/131; 358/2.1; 358/1.14; 358/448

(58) Field of Classification Search ........................ None
See application file for complete search history.

(56) References Cited

U.S. PATENT DOCUMENTS

| | | | | |
|---|---|---|---|---|
| 5,819,094 A * | 10/1998 | Sato et al. | ....................... | 717/131 |
| 6,071,317 A * | 6/2000 | Nagel | ............................ | 717/128 |
| 6,110,224 A * | 8/2000 | Kawabe et al. | ................ | 717/131 |
| 6,721,941 B1 * | 4/2004 | Morshed et al. | ............... | 717/127 |
| 6,782,495 B2 * | 8/2004 | Bernklau-Halvor | ............ | 714/44 |
| 7,426,048 B2 * | 9/2008 | Sakai et al. | .................... | 358/1.14 |
| 7,437,717 B1 * | 10/2008 | Cowan et al. | ................. | 717/131 |
| 7,546,587 B2 * | 6/2009 | Marr et al. | ..................... | 717/127 |
| 7,669,190 B2 * | 2/2010 | Konda et al. | .................... | 717/128 |
| 7,886,279 B2 * | 2/2011 | Mihara | ......................... | 717/128 |
| 7,975,261 B2 * | 7/2011 | Teranishi et al. | ............. | 717/128 |
| 2001/0020293 A1 * | 9/2001 | Uchihira et al. | ................... | 717/4 |
| 2003/0043392 A1 * | 3/2003 | Sugimoto | ....................... | 358/1.9 |
| 2003/0081255 A1 * | 5/2003 | Shimizu | ......................... | 358/2.1 |
| 2003/0084376 A1 * | 5/2003 | Nash et al. | ....................... | 714/38 |
| 2004/0003326 A1 * | 1/2004 | Lizuka | ............................ | 714/45 |
| 2004/0015736 A1 * | 1/2004 | Mihara | ............................ | 714/20 |
| 2004/0172602 A1 * | 9/2004 | Iida et al. | ....................... | 715/530 |
| 2004/0199903 A1 * | 10/2004 | Iizuka | ............................ | 717/128 |
| 2005/0171731 A1 * | 8/2005 | Chen et al. | ..................... | 702/176 |
| 2005/0216895 A1 * | 9/2005 | Tran | ................................ | 717/127 |
| 2006/0136134 A1 * | 6/2006 | Mihara | ............................ | 702/9 |
| 2006/0146847 A1 * | 7/2006 | Mihara | ......................... | 370/409 |
| 2006/0150017 A1 * | 7/2006 | Mihara | ............................ | 714/25 |

FOREIGN PATENT DOCUMENTS

JP    A 2004-38311    6/2002

OTHER PUBLICATIONS

Xing Li et al., Modeling for Image Processing System Validation, Verification and Testing, [Online], May 2005, pp. 1-4, [Retrived from Internet on Feb. 8, 2012], <http://delivery.acm.org/10.1145/1090000/1083290/p16-li.pdf>.*

(Continued)

*Primary Examiner* — Thuy Dao
*Assistant Examiner* — Ziaul A Chowdhury
(74) *Attorney, Agent, or Firm* — Fitzpatrick, Cella, Harper & Scinto

(57) ABSTRACT

An information processor determines whether or not function which first module has requested to call is a color information setting function for setting color information for second module and, if the function is the color information setting function, stores the color information in a storage unit. The processor determines whether or not the function which the first module has requested to call is an image output function for instructing output of a predetermined image with the use of the color information set for the second module by the color information setting function and, if the function is the image output function, outputs the color information stored in the storage unit in association with image attribute information about the predetermined image as history information.

10 Claims, 23 Drawing Sheets

OTHER PUBLICATIONS

Anthony Rowe et al., "A Second Generation Low Cost Embedded Color Vision System", [Online], 2005, pp. 1-7, [Retrieved from Internet on Feb. 8, 2012], <http://www.andrew.cmu.edu/user/agr/pubpg/ecv_2005.pdf>.*

Cosmin Stoica Spahiu, A Multimedia Database Server for information and Qierying, 2009, pp. 517-523, [Online], [Retrieved from Internet on Feb. 8, 2012], <http://ieeexplore.ieee.org/stamp/stamp.jsp?tp=&arnumber=5352790>.*

Mark D. Fairchild, "A Simple Printer Calibration Technique for "Good Enough" Color Reproduction of CRT Images", [Online], 1994, pp. 1-18, [Retrieved from Internet on Feb. 8, 2012], <http://citeseerx.ist.psu.edu/viewdoc/download?doi=10.1.1.38.9722&rep=rep1&type=pdf>.*

* cited by examiner

FIG. 7

| | | | |
|---|---|---|---|
| 136 | EXE | Interface A' VTable | Method A'A Address — 145 |
| | | | Method A'B Address — 146 |
| 137 | | | Method A'C Address — 147 |
| | | Interface B' VTable | Method B'A Address — 148 |
| | | | Method B'B Address — 149 |
| 138 | | | Method B'C Address — 150 |
| 139 | COM Server | Interface A | Method AA Code — 151 |
| | | | Method AB Code — 152 |
| | | | Method AC Code — 153 |
| 140 | | Interface B | Method BA Code — 154 |
| | | | Method BB Code — 155 |
| 141 | | | Method BC Code — 156 |
| | | ⋮ | |
| 142 | DLL | Interface A' | Method A'A Code (Call Method AA) — 157 |
| | | | Method A'B Code (Call Method AB) — 158 |
| | | | Method A'C Code (Call Method AC) — 159 |
| 143 | | Interface B' | Method B'A Code (Call Method BA) — 160 |
| | | | Method B'B Code (Call Method BB) — 161 |
| 144 | | | Method B'C Code (Call Method BC) — 162 |

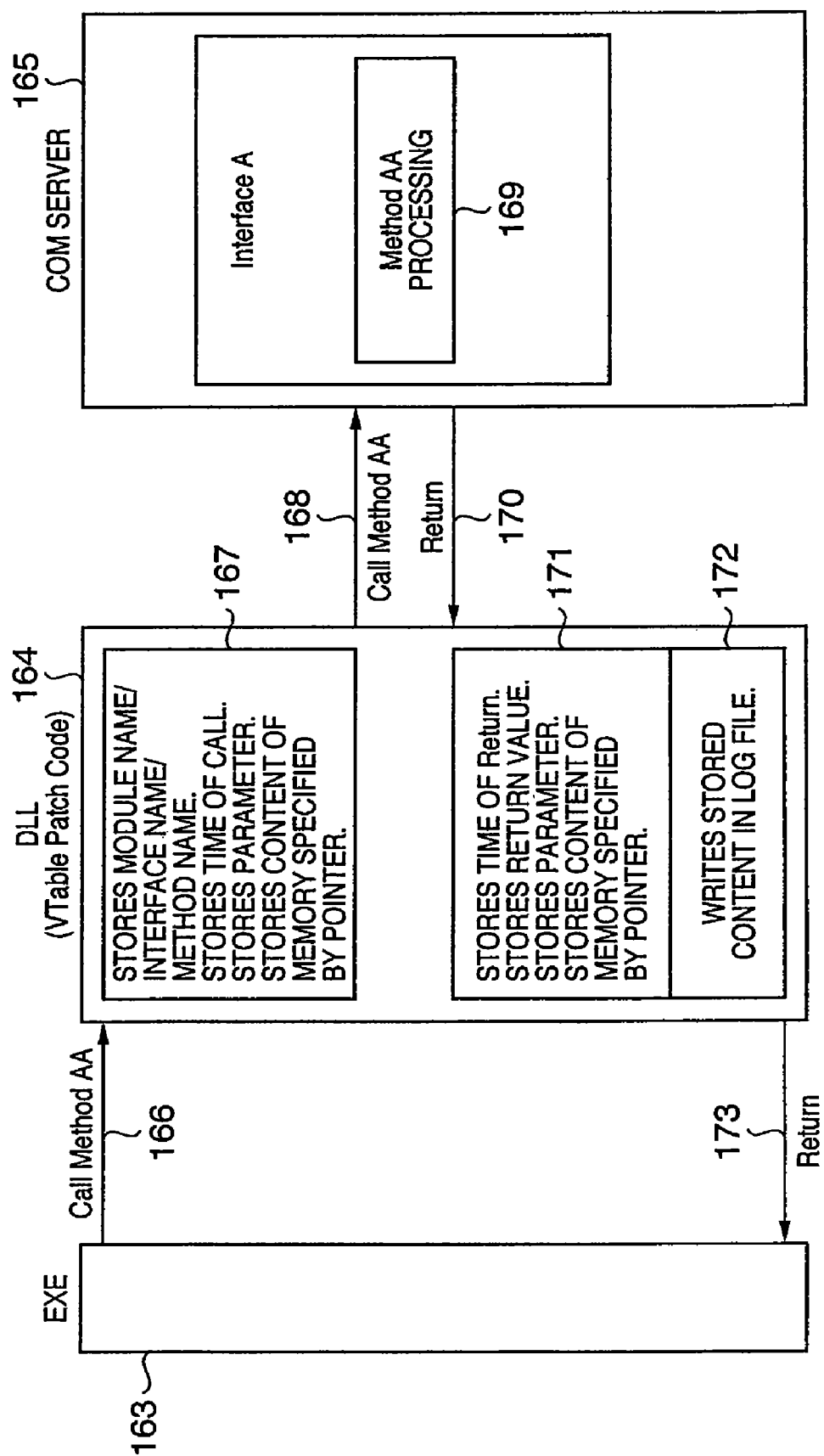

FIG. 10

```
[
    uuid(58DB5633-0694-4340-97CE-4E1AC6BFFBA7),   //TestDllStd.
    helpstring('TestDullStd Type Library For PAT'),
    version(1.0)
]

library TestDullStd
{
        typedef [public] struct
        {
                char chParam;
                unsigned char uchParam;
                short sParam;
                unsigned short usParam;
                int nParam;
                unsigned int unParam;
                long lParam;
                unsigned long ulParam;
                double dbParam;
                float fParam;
        } TESTSTRUCT;
        typedef [public] TESTSTRUCT *LPTESTSTRUCT;

//DEFINE_GUID(GUID_PROGID, 0x8e037d65, 0xefa0, 0x40e7, 0x91, 0x43, 0xef, 0x70, 0x56,
0x94, 0x5b, 0x79);
    [
        uuid(8E037D65-EFA0-40e7-9143-EF7056945B79),
        helpstring('TestDullStd.dll for PAT object.'),
    ]
        interface
        test
        {
                char_stdcall FuncCharStd([in] char chParam);
                char*_stdcall FuncPCharStd([in, out] char* lpchParam);

TESTSTRUCT_stdcall FuncStructStd([in]TESTSTRUCT TestStruct);
                LPTESTSTRUCT_stdcall FuncStructStd([in, out]LPTESTSTRUCT lpTestStruct);
        };
}
```

FIG. 11

```
typedef DWORD    HDC;    ~200
typedef DWORD    COLOR;  ~201
    //"COLOR" IS DATA OF 4 BYTES IN WHICH RED, GREEN AND BLUE VALUES
    //ARE SET FOR EACH 1 BYTE FROM LOWEST BYTE, AND HIGHEST ONE BYTE
    //DOES NOT HAVE MEANINGFUL VALUE interface
OSGraphicKernel
{
    BOOL TextOut  ~202
    (
        [in] HDC hdc,        //HANDLE OF DEVICE CONTEXT
        [in] int nXStart,    //X COORDINATE OF DRAWING STARTING POSITION
        [in] int nYStart,    //Y COORDINATE OF DRAWING STARTING POSITION
        [in] LPSTR lpString, //CHARACTER STRING
        [in] int cbString,   //THE NUMBER OF CHARACTERS
    );
    COLOR GetTextColor  ~203
    (
        [in] HDC hdc,        //HANDLE OF DEVICE CONTEXT
    );
    COLOR SetTextColor  ~204
    (
        [in] HDC hdc,        //HANDLE OF DEVICE CONTEXT
        [in] COLOR cColor    //COLOR OF TEXT
    );
};
```

FIG. 13

| | |
|---|---|
| MODULE NAME : | OSGraphicKernel. DLL |
| FUNCTION NAME : | SetTextColor |
| ARGUMENT (in) : | HDC hDC: 0x12345FD0 |
| | COLOR cColor: 0x0000FF00 |
| ARGUMENT (out) : | |
| RETURN VALUE : | COLOR cColor: 0x000000FF |
| IN TIME : | 2002/03/25 22:24:12.025 |
| OUT TIME : | 2002/03/25 22:24:12.035 |
| | |
| MODULE NAME : | OSGraphicKernel. DLL |
| FUNCTION NAME : | TextOut |
| ARGUMENT (in) : | HDC hDC: 0x12345FD0 |
| | int nXStart: 100 |
| | int nYStart: 50 |
| | LPSTR lpString: "ABC" |
| | int cbString: 3 |
| COLOR : | TRUE: RGB=(0, 255, 0) ～205 |
| ARGUMENT (out) : | |
| RETURN VALUE : | BOOL: 1 |
| IN TIME : | 2002/03/25 22:24:12. 046 |
| OUT TIME : | 2002/03/25 22:24:12. 057 |
| | |
| MODULE NAME : | OSGraphicKernel. DLL |
| FUNCTION NAME : | SetTextColor |
| ARGUMENT (in) : | HDC hDC: 0x12345FD0 |
| | COLOR cColor: 0x007F7F7F |
| ARGUMENT (out) : | |
| RETURN VALUE : | COLOR nColor: 0x0000FF00 |
| IN TIME : | 2002/03/25 22:24:12. 068 |
| OUT TIME : | 2002/03/25 22:24:12. 079 |
| | |
| MODULE NAME : | OSGraphicKernel. DLL |
| FUNCTION NAME : | TextOut |
| ARGUMENT (in) : | HDC hDC: 0x12345FD0 |
| | int nXStart: 200 |
| | int nYStart: 100 |
| | LPSTR lpString: "DEFGHI" |
| | int cbString: 6 |
| COLOR : | FLASE: RGB=(127, 127, 127) ～206 |
| ARGUMENT (out) : | |
| RETURN VALUE : | BOOL: 1 |
| IN TIME : | 2002/03/25 22:24:12. 100 |
| OUT TIME : | 2002/03/25 22:24:12. 179 |

| | |
|---|---|
| MODULE NAME : | OSGraphicKernel. DLL |
| FUNCTION NAME : | TextOut |
| ARGUMENT (in) : | HDC hDC: 0x12345FD0 |
| | int nXStart: 100 |
| | int nYStart: 50 |
| | LPSTR lpString: "ABC" |
| | int cbString: 3 |
| COLOR : | TRUE: RGB=(0, 255, 0) ~207 |
| ARGUMENT (out) : | |
| RETURN VALUE : | BOOL: 1 |
| IN TIME : | 2002/03/25 22:24:12. 046 |
| OUT TIME : | 2002/03/25 22:24:12. 057 |
| | |
| MODULE NAME : | OSGraphicKernel. DLL |
| FUNCTION NAME : | TextOut |
| ARGUMENT (in) : | HDC hDC: 0x12345FD0 |
| | int nXStart: 200 |
| | int nYStart: 100 |
| | LPSTR lpString: "DEFGHI" |
| | int cbString: 6 |
| COLOR : | FLASE: RGB=(127, 127, 127) ~208 |
| ARGUMENT (out) : | |
| RETURN VALUE : | BOOL: 1 |
| IN TIME : | 2002/03/25 22:24:12. 100 |
| OUT TIME : | 2002/03/25 22:24:12. 179 |
| | |
| MODULE NAME : | OSGraphicKernel. DLL |
| FUNCTION NAME : | TextOut |
| ARGUMENT (in) : | HDC hDC: 0x12345FD0 |
| | int nXStart: 300 |
| | int nYStart: 150 |
| | LPSTR lpString: "JKH" |
| | int cbString: 3 |
| COLOR : | TRUE: RGB=(255, 0, 0) ~209 |
| ARGUMENT (out) : | |
| RETURN VALUE : | BOOL: 1 |
| IN TIME : | 2002/03/25 22:24:12. 248 |
| OUT TIME : | 2002/03/25 22:24:12. 259 |

| | |
|---|---|
| MODULE NAME : | OSGraphicKernel. DLL |
| FUNCTION NAME : | TextOut |
| ARGUMENT (in) : | HDC hDC: 0x12345FD0 |
| | int nXStart: 100 |
| | int nYStart: 50 |
| | LPSTR lpString: "ABC" |
| | int cbString: 3 |
| COLOR : | RGB=(0, 255, 0) ~210 |
| ARGUMENT (out) : | |
| RETURN VALUE : | BOOL: 1 |
| IN TIME : | 2002/03/25 22:24:12. 046 |
| OUT TIME : | 2002/03/25 22:24:12. 057 |
| | |
| MODULE NAME : | OSGraphicKernel. DLL |
| FUNCTION NAME : | TextOut |
| ARGUMENT (in) : | HDC hDC: 0x12345FD0 |
| | int nXStart: 200 |
| | int nYStart: 100 |
| | LPSTR lpString: "DEFGHI" |
| | int cbString: 6 |
| ARGUMENT (out) : | |
| RETURN VALUE : | BOOL: 1 |
| IN TIME : | 2002/03/25 22:24:12. 100 |
| OUT TIME : | 2002/03/25 22:24:12. 179 |
| | |
| MODULE NAME : | OSGraphicKernel. DLL |
| FUNCTION NAME : | TextOut |
| ARGUMENT (in) : | HDC hDC: 0x12345FD0 |
| | int nXStart: 300 |
| | int nYStart: 150 |
| | LPSTR lpString: "JKH" |
| | int cbString: 3 |
| COLOR : | RGB=(255, 0, 0) ~211 |
| ARGUMENT (out) : | |
| RETURN VALUE : | BOOL: 1 |
| IN TIME : | 2002/03/25 22:24:12. 248 |
| OUT TIME : | 2002/03/25 22:24:12. 259 |

```
typedef DWORD    HDC;    ~200
typedef DWORD    HPEN;   ~221
typedef DWORD    COLOR;  ~222
    //"COLOR" IS DATA OF 4 BYTES IN WHICH RED, GREEN AND BLUE VALUES
    //ARE SET FOR EACH 1 BYTE FROM LOWEST BYTE, AND HIGHEST ONE BYTE
    //DOES NOT HAVE MEANINGFUL VALUE interface
OSGraphicKernel
{
    HPEN CreatePen  ~223
    (
        [in] COLOR cColor      //COLOR OF PEN OBJECT
    );
    BOOL SelectPen  ~224
    (
        [in] HDC hdc,          //HANDLE OF DEVICE CONTEXT
        [in] HPEN hPen         //HANDLE OF PEN OBJECT
    );
    void SetStartPoint  ~225
    (
        [in] HDC hdc,          //HANDLE OF DEVICE CONTEXT
        [in] int nXStart,      //X COORDINATE OF DRAWING STARTING POSITION
        [in] int nYStart,      //Y COORDINATE OF DRAWING STARTING POSITION
    );
    void LineTo  ~226
    (
        [in] HDC hdc,          //HANDLE OF DEVICE CONTEXT
        [in] int nXEnd,        //X COORDINATE OF DRAWING ENDING POSITION
        [in] int nYEnd,        //Y COORDINATE OF DRAWING ENDING POSITION
    );
    BOOL GetCurrentPenAttribute  ~227
    (
        [in] HDC hdc,          //HANDLE OF DEVICE CONTEXT
        [out] COLOR* pcColor   //COLOR OF PEN OBJECT
    );
    void DeletePen  ~228
    (
        [in] HPEN hPen         //HANDLE OF PEN OBJECT
    );
};
```

FIG. 20

| | |
|---|---|
| MODULE NAME : | OSGraphicKernel. DLL |
| FUNCTION NAME : | SetStartPoint |
| ARGUMENT (in) : | HDC hDC: 0x12345FD0 |
| | int nXStart: 100 |
| | int nYStart: 50 |
| ARGUMENT (out) : | |
| RETURN VALUE : | |
| IN TIME : | 2002/03/25 22:24:12. 046 |
| OUT TIME : | 2002/03/25 22:24:12. 057 |
| | |
| MODULE NAME : | OSGraphicKernel. DLL |
| FUNCTION NAME : | LineTo |
| ARGUMENT (in) : | HDC hDC: 0x12345FD0 |
| | int nXEnd: 200 |
| | int nYEnd: 100 |
| COLOR : | RGB=(255, 0, 0)  ～212 |
| ARGUMENT (out) : | |
| RETURN VALUE : | |
| IN TIME : | 2002/03/25 22:24:12. 100 |
| OUT TIME : | 2002/03/25 22:24:12. 179 |
| | |
| MODULE NAME : | OSGraphicKernel. DLL |
| FUNCTION NAME : | SetStartPoint |
| ARGUMENT (in) : | HDC hDC: 0x12345FD0 |
| | int nXStart: 300 |
| | int nYStart: 150 |
| ARGUMENT (out) : | |
| RETURN VALUE : | |
| IN TIME : | 2002/03/25 22:24:12. 225 |
| OUT TIME : | 2002/03/25 22:24:12. 236 |
| | |
| MODULE NAME : | OSGraphicKernel. DLL |
| FUNCTION NAME : | LineTo |
| ARGUMENT (in) : | HDC hDC: 0x12345FD0 |
| | int nXEnd: 350 |
| | int nYEnd: 200 |
| COLOR : | RGB=(0, 0, 255)  ～213 |
| ARGUMENT (out) : | |
| RETURN VALUE : | |
| IN TIME : | 2002/03/25 22:24:12. 344 |
| OUT TIME : | 2002/03/25 22:24:12. 356 |

LOG OF PRINT API TO PRINTER WITH OR WITHOUT COLOR

| MODULE NAME | FUNCTION/METHOD NAME | TIME OF CALL | TIME OF Return |
|---|---|---|---|
| OSGraphicKernel.DLL | SetStartPoint | 2002/03/25 22:24:12.046 | 2002/03/25 22:24:12.046 |
| OSGraphicKernel.DLL | LineTo | 2002/03/25 22:24:12.046 | 2002/03/25 22:24:12.046 |
| OSGraphicKernel.DLL | SetStartPoint | 2002/03/25 22:24:12.046 | 2002/03/25 22:24:12.046 |
| OSGraphicKernel.DLL | LineTo | 2002/03/25 22:24:12.046 | 2002/03/25 22:24:12.046 |
| OSGraphicKernel.DLL | SetStartPoint | 2002/03/25 22:24:12.046 | 2002/03/25 22:24:12.046 |
| OSGraphicKernel.DLL | LineTo | 2002/03/25 22:24:12.046 | 2002/03/25 22:24:12.046 |
| OSGraphicKernel.DLL | SetStartPoint | 2002/03/25 22:24:12.046 | 2002/03/25 22:24:12.046 |
| OSGraphicKernel.DLL | LineTo | 2002/03/25 22:24:12.046 | 2002/03/25 22:24:12.057 |
| OSGraphicKernel.DLL | SetStartPoint | 2002/03/25 22:24:12.057 | 2002/03/25 22:24:12.057 |
| OSGraphicKernel.DLL | LineTo | 2002/03/25 22:24:12.057 | 2002/03/25 22:24:12.057 |
| OSGraphicKernel.DLL | SetStartPoint | 2002/03/25 22:24:12.057 | 2002/03/25 22:24:12.057 |
| OSGraphicKernel.DLL | LineTo | 2002/03/25 22:24:12.057 | 2002/03/25 22:24:12.057 |
| OSGraphicKernel.DLL | SetStartPoint | 2002/03/25 22:24:12.057 | 2002/03/25 22:24:12.057 |
| OSGraphicKernel.DLL | LineTo | 2002/03/25 22:24:12.057 | 2002/03/25 22:24:12.057 |
| OSGraphicKernel.DLL | SetStartPoint | 2002/03/25 22:24:12.057 | 2002/03/25 22:24:12.068 |
| OSGraphicKernel.DLL | LineTo | 2002/03/25 22:24:12.068 | 2002/03/25 22:24:12.068 |
| OSGraphicKernel.DLL | SetStartPoint | 2002/03/25 22:24:12.068 | 2002/03/25 22:24:12.068 |
| OSGraphicKernel.DLL | LineTo | 2002/03/25 22:24:12.068 | 2002/03/25 22:24:12.068 |
| OSGraphicKernel.DLL | SetStartPoint | 2002/03/25 22:24:12.068 | 2002/03/25 22:24:12.068 |
| OSGraphicKernel.DLL | LineTo | 2002/03/25 22:24:12.068 | 2002/03/25 22:24:12.068 |
| OSGraphicKernel.DLL | SetStartPoint | 2002/03/25 22:24:12.068 | 2002/03/25 22:24:12.068 |
| OSGraphicKernel.DLL | LineTo | 2002/03/25 22:24:12.068 | 2002/03/25 22:24:12.079 |
| OSGraphicKernel.DLL | SetStartPoint | 2002/03/25 22:24:12.079 | 2002/03/25 22:24:12.079 |
| OSGraphicKernel.DLL | LineTo | 2002/03/25 22:24:12.079 | 2002/03/25 22:24:12.079 |

INFORMATION PROCESSOR, CONTROL METHOD THEREFOR, COMPUTER PROGRAM AND STORAGE MEDIUM

FIELD OF THE INVENTION

The present invention relates to a technique for debugging software.

BACKGROUND OF THE INVENTION

There has been known a method in which software is debugged by adding a routine for outputting a processing log to a source code of software being developed and analyzing a processing log outputted when the software is executed, in order to solve problems of software with a low reproducibility.

Debugging by such a method is also applied to a development process of software for controlling the operation of an image forming apparatus such as a printer. For example, assume the following situation: when print processing is performed based on outputted data with a particular color intended, a failure occurs that the output result is different from expected one because of a bug of developed software. In this case, conventional debugging has been performed by adding a routine for outputting a processing log to all source codes for performing processing or communication related to color data, acquiring a log about the color data for each module and analyzing the log.

However, the above-described conventional technique has the following problems.

(1) Since each of modules configuring software being developed outputs a log individually, it is necessary to analyze the respective logs after integrating them in order to verify the processing of the entire software. Therefore, a large number of man-hours are required until the position of a problem is found from the log analysis.

(2) Though it is necessary to arrange an appropriate log acquisition routine at an appropriate position in a source code in order to make it possible to quickly obtain meaningful information by analyzing a log, it is generally difficult to configure such a routine.

Therefore, there is proposed a configuration in which a log acquisition module is provided which mediates a call from a module corresponding to application software to a function existing in a different module and acquires a log of processing performed by the different module responding to the call, in software separated into multiple modules (see Japanese Patent Laid-Open No. 2004-38311 or U.S. Patent Publication No. US2004/0003326, for example). According to this configuration, a processing log can be acquired without adding a routine for outputting a processing log to each module.

(3) However, in this case also, the number of logs to be acquired may be very large in the case of software handling a great amount of data or because of the configuration of the log acquisition routine, so that the analysis work may be difficult. Especially in debugging work for software for an image forming apparatus, if all color data is stored in a log, it takes a lot of time to acquire the log and the size of a log file is very large. Therefore, it is difficult to obtain useful information by analyzing the log file, and a lot of man-hours are required for the analysis work.

As described above, in the conventional configuration, a great number of man-hours are required to analyze a processing log of software which handles color data.

SUMMARY OF THE INVENTION

The present invention has been made in consideration of the above problem, and its object is to provide a technique for making it possible to easily analyze a processing log especially of software which handles color data.

In order to achieve the above object, an information processor according to the present invention has the configuration below, for example. That is, the information processor is an information processor for executing a first and a second modules and a third module for mediating a call from the first module to a function in the second module and acquiring a processing log of the second module which responds to the call; the information processor comprising:

a storage control unit adapted to determine whether or not the function which the first module has requested to call is a color information setting function for setting color information for the second module and, if the function is the color information setting function, store the color information in a storage unit; and an output unit adapted to determine whether or not the function which the first module has requested to call is an image output function for instructing output of a predetermined image with the use of the color information set for the second module by the color information setting function and, if the function is the image output function, output the color information stored in the storage unit in association with image attribute information about the predetermined image as history information.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

FIG. 7 illustratively shows the memory configuration of the information processor according to the present embodiment;

FIG. 8 shows an example of a timing chart in the case of executing VTable Patch in the information processor according to the present embodiment;

FIG. 10 illustratively shows the content of a function definition file to be used in the present embodiment;

FIG. 11 illustratively shows the content of a function definition file for a function of issuing a text drawing command to be used in the present embodiment;

FIG. 13 illustratively shows log data in the first embodiment;

FIG. 15 illustratively shows log data in the second embodiment;

FIG. 17 illustratively shows log data in the third embodiment;

FIG. 18 shows an example of a function definition file to be used in a fourth embodiment;

FIG. 20 illustratively shows log data in the fourth embodiment;

FIG. 21 illustratively shows a user interface for displaying log data in a fifth embodiment;

DETAILED DESCRIPTION OF THE PREFERRED EMBODIMENTS

Embodiments according to the present invention will be described below in detail with reference to accompanying drawings. The components described in the embodiments, however, are shown only as examples, and they are not intended to limit the scope of the invention thereto.

[First Embodiment]
<System Configuration>

Figure 1:
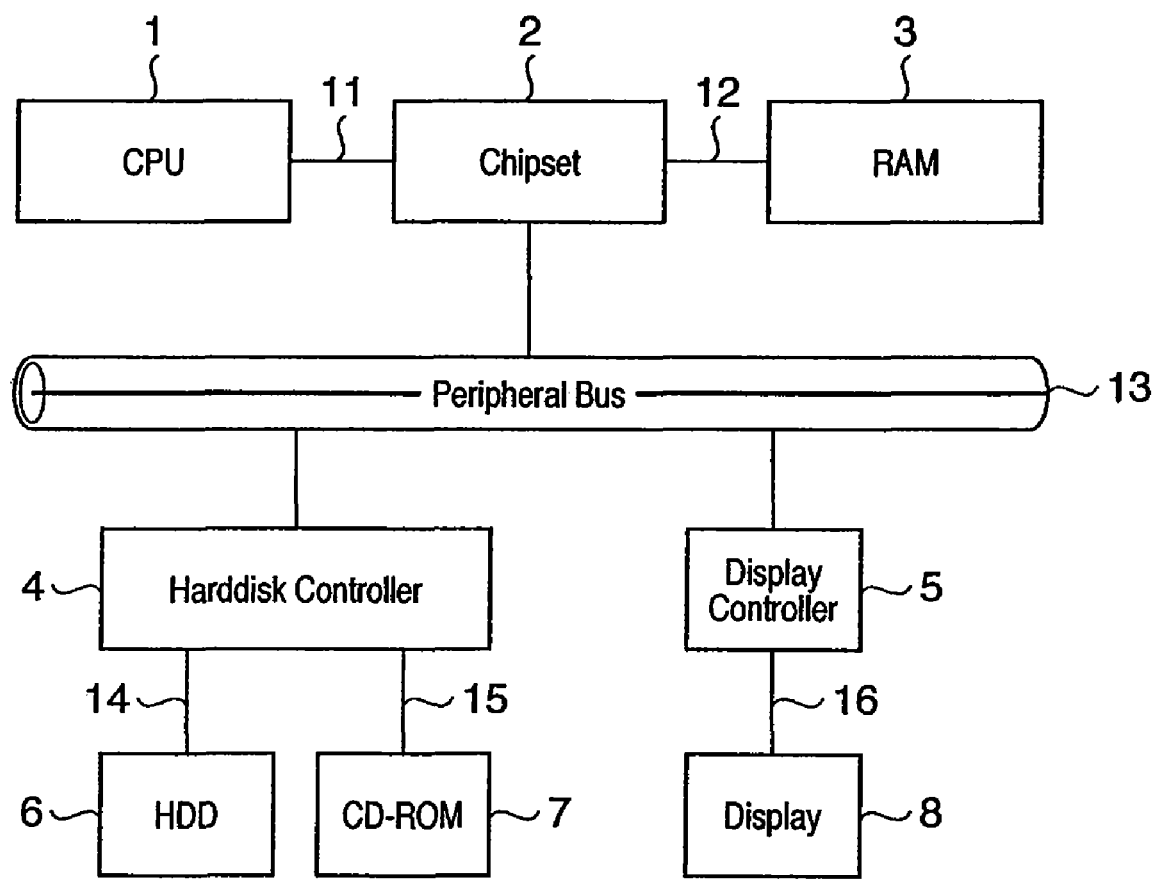
FIG. 1 shows an example of the configuration of an information processor according to the present embodiment.

FIG. 1 illustratively shows the configuration of an information processor according to this embodiment. In this embodiment, it is assumed that an information processing system is constructed inside one PC for simplification of the description. However, the characteristics of the present invention are also effective in a distributed environment in which multiple information processors are used.

As shown in FIG. 1, the information processor (PC) is mounted with a CPU 1, a chip set 2, a RAM 3, a hard disk controller 4, a display controller 5, a hard disk drive (hereinafter referred to as an HDD) 6, a CD-ROM drive 7 and a display 8. It is also mounted with a signal line 11 connecting the CPU 1 and the chip set 2, a signal line 12 connecting the chip set 2 and the RAM 3, a peripheral bus 13 connecting the chip set 2 and various peripheral equipment, a signal line 14 connecting the hard disk controller 4 and the HDD 6, a signal line 15 connecting the hard disk controller 4 and the CD-ROM drive 7 and a signal line 16 connecting the display controller 5 and the display 8.

In FIG. 1, the CPU 1 executes application programs, the operating system (OS), control programs and the like stored in the HDD 6, and performs control to temporarily store information, files and the like required for execution of the programs in the RAM 3.

The chip set 2 is a collection of chips, such as LSI's, on which the peripheral circuits around the CPU 1 in the information processor are mounted, and control circuits for an memory interface and the like are mounted thereon. The RAM 3 is a memory for temporarily storing various data, and it functions as the main memory or the work area of the CPU 1.

The HDD 6 is a very large memory for storing predetermined information. In the HDD 6, application programs, the OS, control programs, related programs and the like are stored. The CD-ROM drive 7 is a device for realizing access to a recording medium, and it is capable of loading a program or the like stored in a CD-ROM medium (recording medium) onto the information processor. The hard disk controller 4 is a device for controlling the operation of the HDD 6 and the CD-ROM drive 7.

The display 8 is a display output device, which displays an inputted command, a response output to the command by the information processor, and the like. The display controller 5 mediates between the peripheral bus 13 and the display 8 and controls the operation of the display 8. The peripheral bus 13 controls the flow of data within the information processor.

Software which realizes the same function as that of each device described above can be used to make configuration, instead of the hardware devices. The configuration in FIG. 1 is a minimum configuration required to embody the present invention, and a configuration with other devices added as components is also possible.

In this embodiment, an example is shown in which programs and related data according to this embodiment are loaded from a medium directly onto the RAM 3. In addition, it is also possible to, every time a program according to this embodiment is operated, load the program onto the RAM 3 from the HDD 6 in which the program is already installed. Furthermore, it is also possible to record the program according to this embodiment in a ROM (not shown), make configuration in a manner that the program forms a part of a memory map, and execute it directly by the CPU 1.

<IAT Patch>

Figure 2:
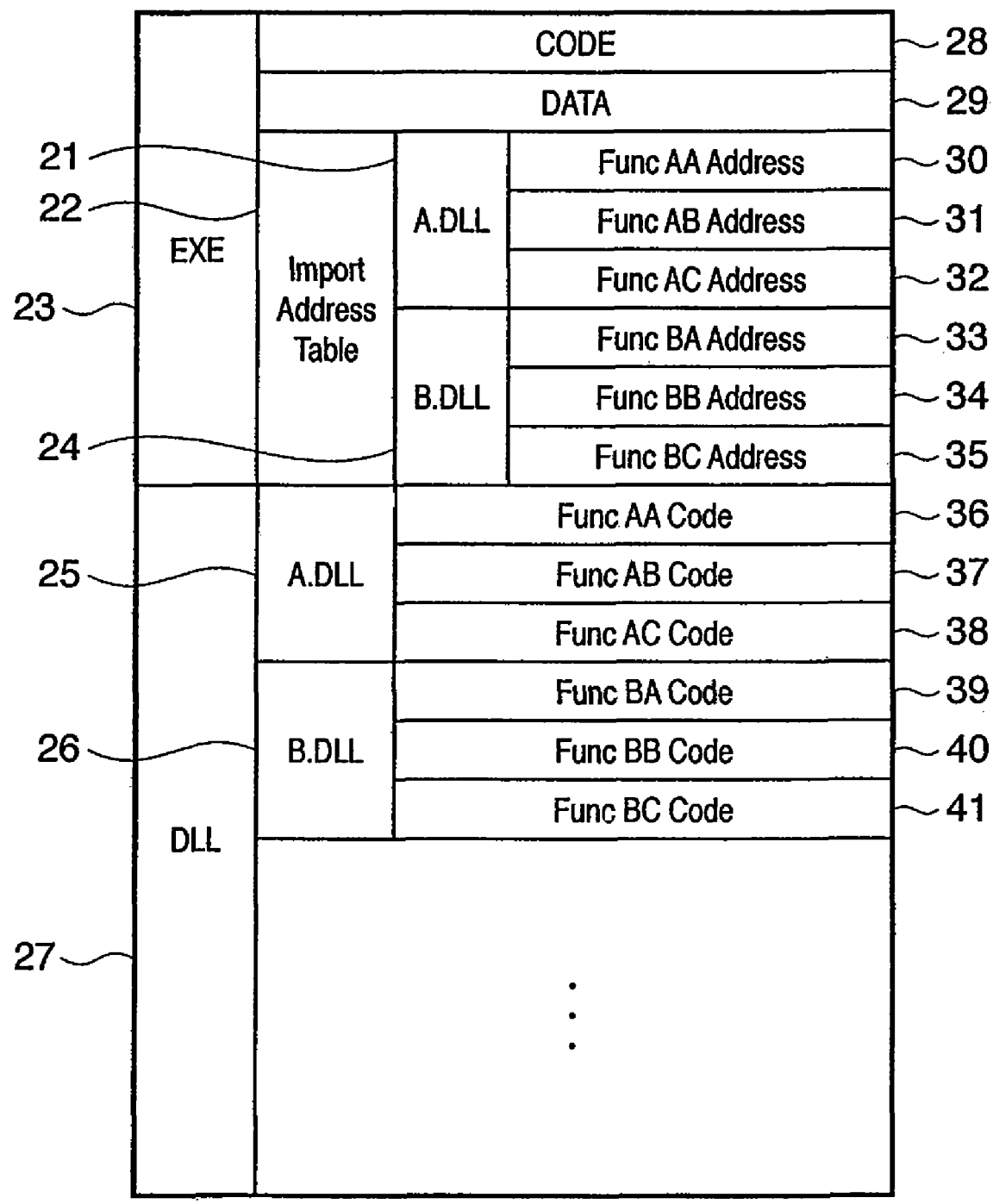
FIG. 2 illustratively shows that software divided in multiple modules is loaded on the memory of the information processor according to the present embodiment.

Next, description will be made on how software to be evaluated, which is configured by multiple modules, is loaded onto a memory (RAM 3) in a normal condition with reference to FIG. 2 in order to describe the information processor according to this embodiment. FIG. 2 schematically shows normal memory configuration at the time of loading a function.

Usually, software configured by multiple modules is loaded, being separated in an executable file (herein after referred to as an EXE) 23 and a dynamic link library (herein after referred to as a DLL) 27. Here, the EXE 23 is a file for performing execution control for the entire software, and the DLL 27 exists as a module and is a file serving as a complement to the EXE 23.

This figure shows an example in which one EXE 23 uses functions in two dynamic libraries, an A.DLL 25 and a B.DLL 26. The functions to be actually used are the following six: Func AA, Func AB, Funs AC, Func BA, Func BB, and Func BC. The entities of the functions in the DLL 27 are loaded, being classified for each of the DLLs 27 (25 and 26), and the functions in each DLL are loaded as a part of the corresponding DLL (36 to 41).

In the RAM 3, the EXE 23 is configured by segments of a code segment 28, a data segment 29 and an import function address table 22. In the code segment 28, there are stored operation codes and the like of the software. In the data segment 29, there is stored data such as variables and constants to be operated.

In the import function address table 22, there are stored addresses of functions defined as the DLL 27, and the EXE 23 acquires the address of a function by referring to the import function address table 22 and loads the function. In the import function address table 22, the address value of a function is stored, being classified according to the DLL to which the function belongs. In the example in FIG. 2, the import function address table 22 is configured by an area 21 in which the addresses of functions included in the A.DLL 25 are stored and an area 24 in which the addresses of functions included in the B.DLL 26 are stored, and the addresses where functions are loaded are stored in each area (30 to 35).

For example, when a code in the code segment in the EXE 23 calls the function Func AA 36, it first refers to the Func AA address 30 stored in the import function address table 22. That is, by referring to the address of the Func AA 36 read as a part of the A.DLL and calling the address, the code in the EXE 23 can call the Func AA 36 of the A.DLL 25.

Figure 3:
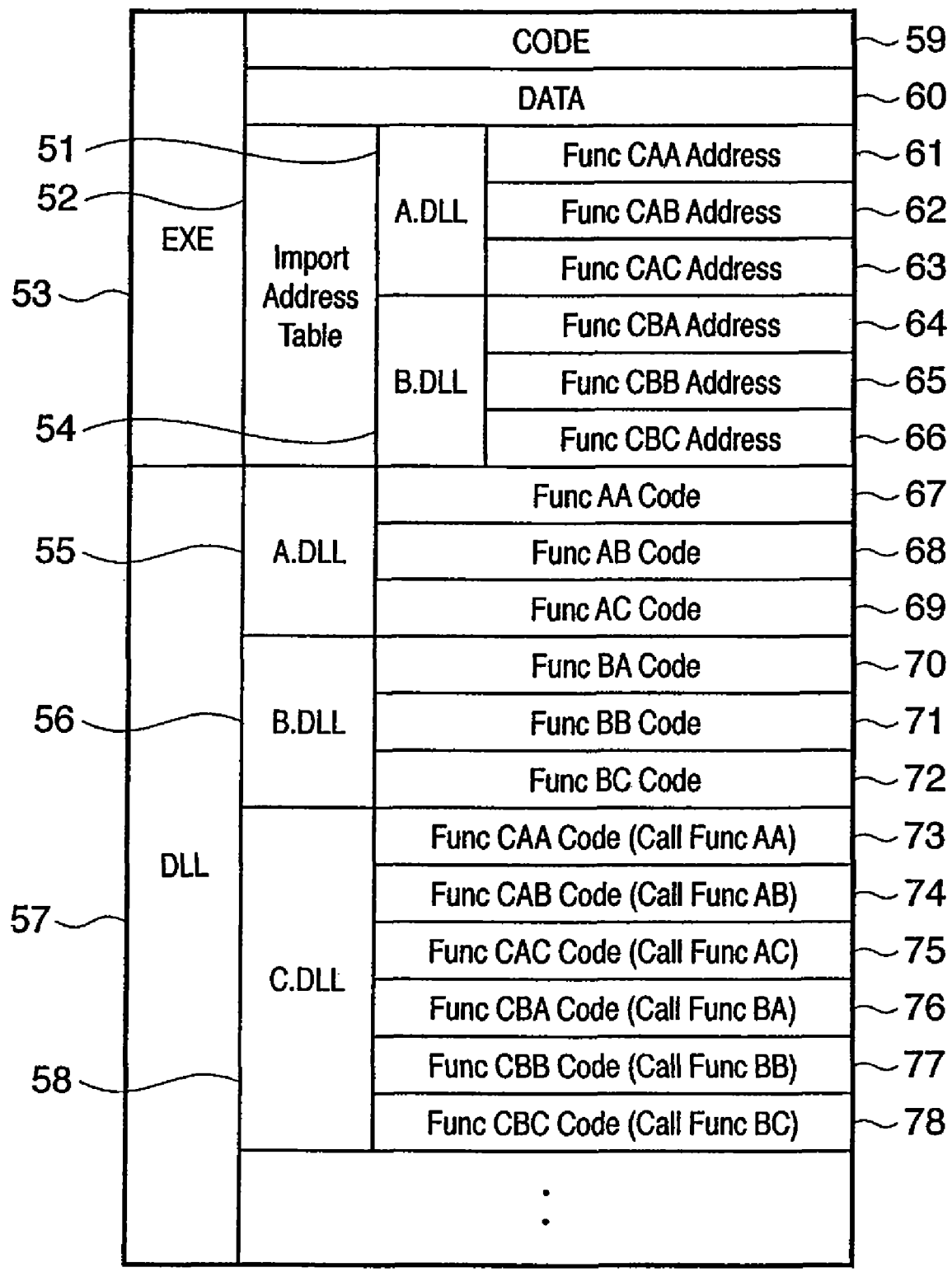
FIG. 3 schematically shows memory configuration in the case of using IAT Patch in the information processor according to the present embodiment.

Next, description will be made on an example of the memory configuration of the information processor when the information processor mediates a function call with the use of an approach referred to as IAT Patch (Import Address Table Patch) for acquiring a log, with reference to FIG. 3.

Output of a log with the use of IAT Patch is realized by storing a module for relaying a function call and outputting necessary information as a log (hereinafter referred to as an API tracer) in the RAM 3, and rewriting an import function address table 52 in an EXE 53. That is, the EXE 53 does not call a DLL 57 directly but calls the DLL 57 indirectly by calling the API tracer for outputting a log to realize output of a log. The details thereof will be described below.

As preprocessing for acquiring a log, the information processor according to this embodiment reads a function definition file and a trace scenario file to be described later and generates an API trace as a C.DLL. Then, the information processor performs control to load a C.DLL 58, which is a DLL for IAT Patch, onto the RAM 3, as shown in FIG. 3. Here, the codes, a Func CAA 73, Func CAB 74, Func CAC 75, Func CBA 76, Func CBB 77 and Func CBC 78 in the C.DLL 58 record a log and call corresponding functions Func AA 67, Funo AB 68, Func AC 69, Func BA 70, Func BB 71 and Func BC 72 originally loaded on the memory (RAM 3) to be called, respectively.

The information processor according to this embodiment rewrites the addresses of functions written in the import function address table 52 in the EXE 53 with the addresses of the Func CAA 73, Func CAB 74, Func CAC 75, Func CBA 76, Func CBB 77 and Func CBC 78 (61 to 66), which are log acquisition codes in the C.DLL 58, based on the trace scenario file to be described later.

Figure 4:
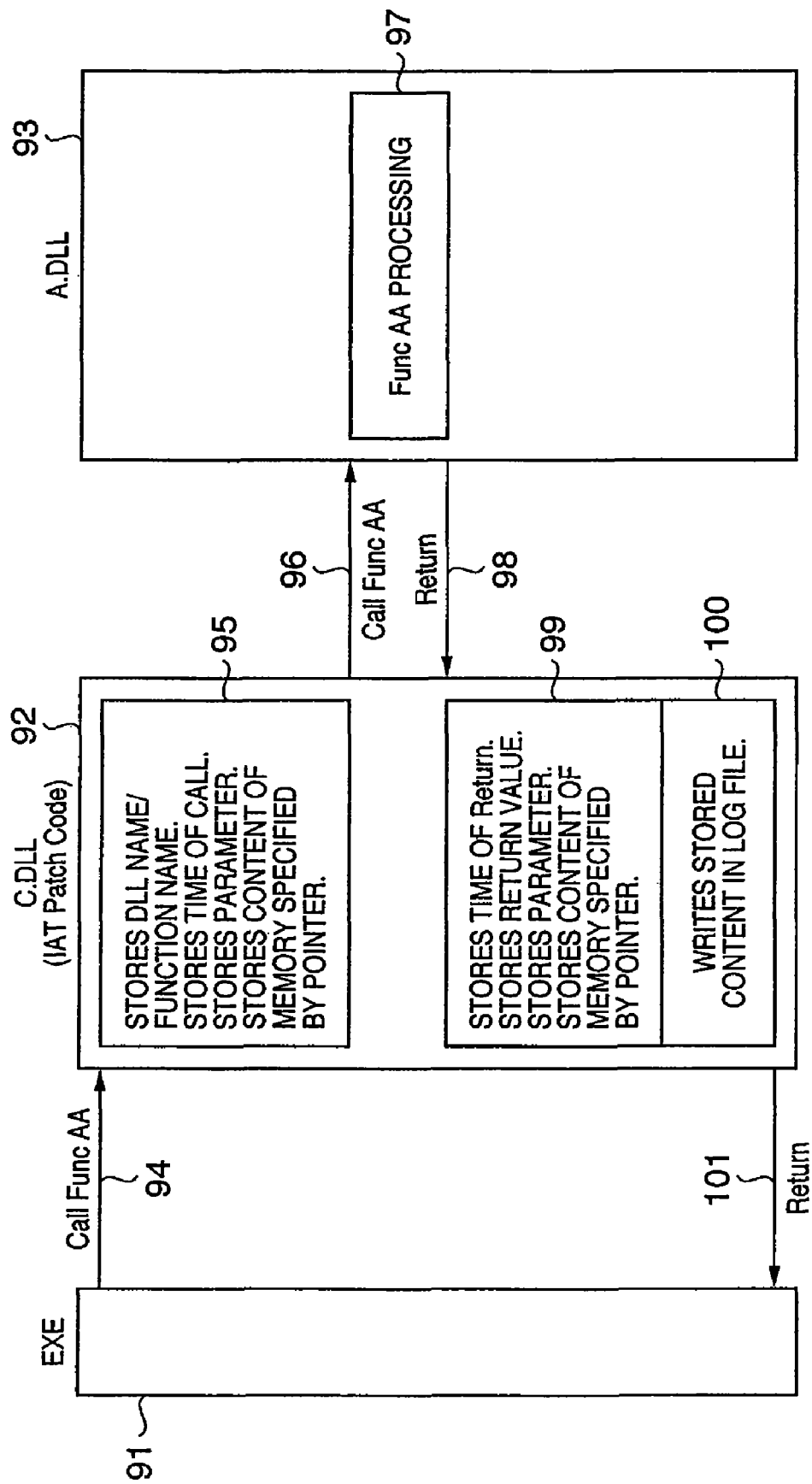
FIG. 4 is a timing chart in the case of executing IAT Patch in the information processor according to the present embodiment.

Next, description will be made on how IAT Patch is realized in the module configuration made as in FIG. 3, with reference to FIG. 4. FIG. 4 is a timing chart indicating the processing by IAT Patch in FIG. 3. Here, there is shown an example of how a log acquisition code (C.DLL 58) operates in IT Patch when the EXE 23 calls the Func AA 36 in the DLL 21. It goes without saying that similar processing is also performed in the case of other functions.

When an EXE 91 calls a Func AA (94), a log acquisition code in a C.DLL 92 stores each of the DLL name/function name, the time of the call, parameters at the time of the call, the content of the memory specified by the pointer parameter at the time of the call and other information in a predetermined storage device (the RAM 3, the HDD 6 or the like) (95). After that, the C.DLL 92 calls the Func AA in an A.DLL 93, which is originally to be called (96).

When Func AA processing (97) by the A.DLL ends and control is returned to the C.DLL 92 (98), the C.DLL 92 stores each of the time of the return, a return value, the content of the memory specified by the pointer parameter at the time of the return and other information in a predetermined storage device (99). After that, the C.DLL 92 writes the stored log information in a file (100) and returns to the EXE 91 as if the Func AA in the A.DLL 93 had ended as usual (101).

Figure 5:
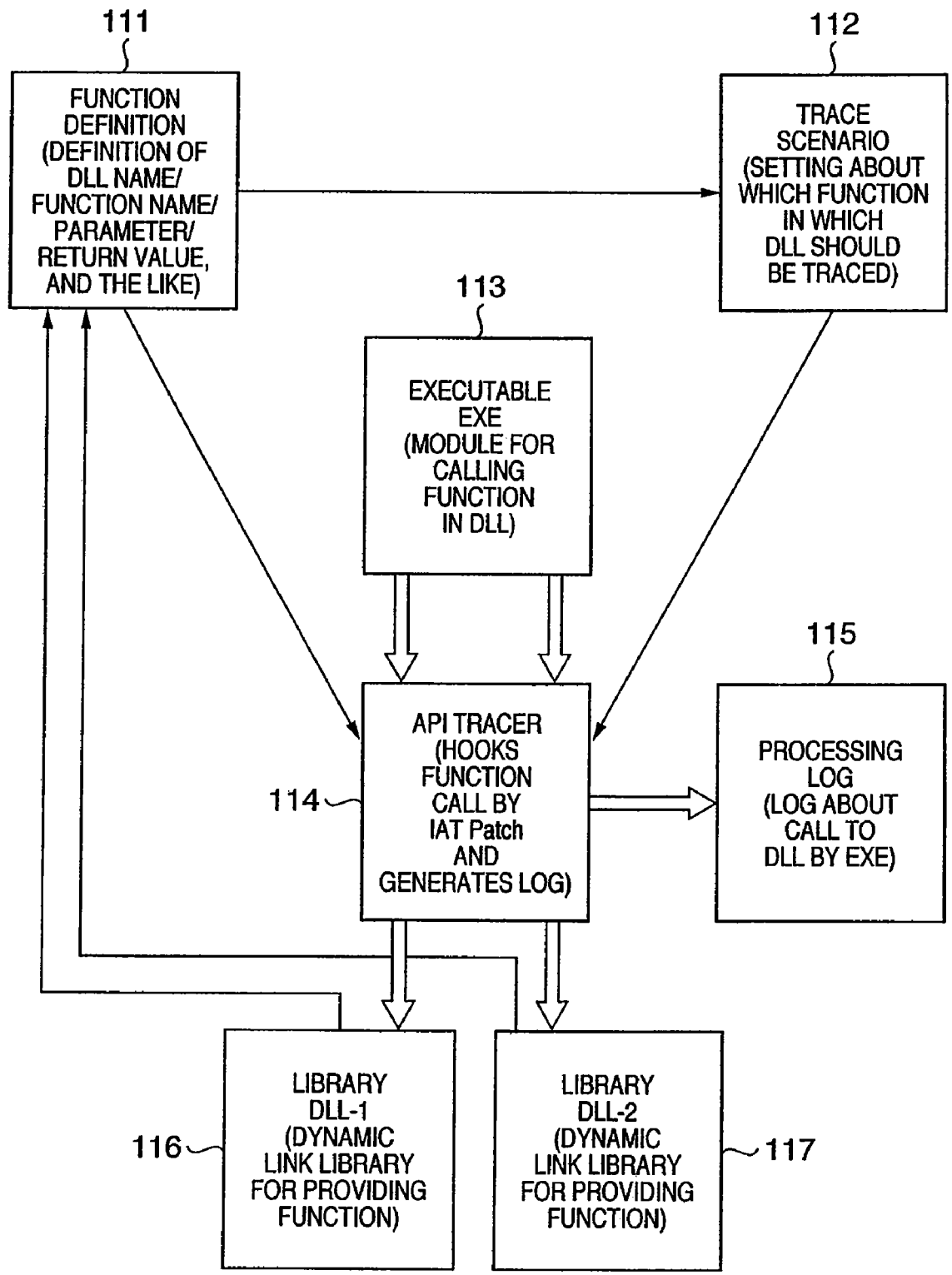
FIG. 5 shows an example of the operation performed when an executable file EXE is executed in the information processor according to the present embodiment.

FIG. 5 illustratively shows the operation performed when an executable file EXE is executed in the information processor according to this embodiment. Usually, an execute-form EXE 113 calls a function in a DLL-1 (116) or a DLL-2 (117). However, a log acquisition code called an API tracer is embedded (114) to generate a processing log (115) here. An API tracer 114 operates based on a function definition file 111 in which definitions of functions in the DLL-1 (116) or the DLL-2 (117) are described and a setting scenario file 112 describing the import function table of which function in which DLL should be rewritten to acquire a log.

<VTable Patch>

Figure 6:
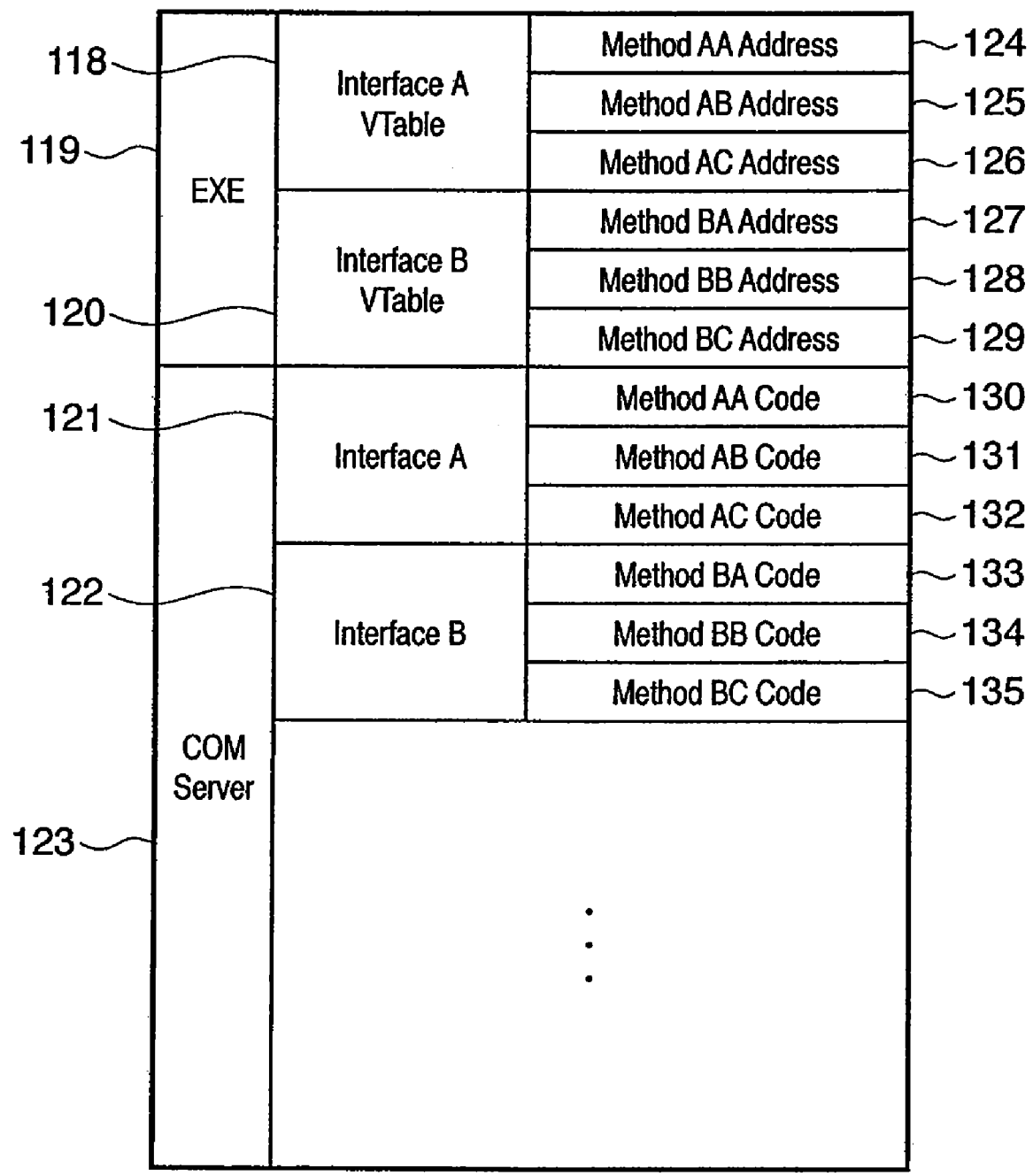
FIG. 6 shows an example of memory configuration in the case where an executable file EXE creates an instance of an exported interface in a COM server, in the information processor according to the present embodiment.

FIG. 6 shows an example of memory configuration in the case where an executable file EXE 119 creates an instance of an exported interface in a COM (Component Object Model) server, in the information processor according to this embodiment.

Usually, when instances of interfaces are created, the requested interface (121 and 122) and the methods (130 to 135) thereof are created in the COM server, and both of them are loaded onto the RAM 3. Here, virtual address tables (118 and 120) are created for the created interfaces, respectively, and handed to an EXE 119 which has issued the creation request. In these virtual address tables, addresses created for the respective methods are written (124 to 129). The EXE 119 uses the information to call each interface. FIG. 6 shows an example in which one EXE 119 creates two interfaces, an Interface A 121 and an Interface B 122, and uses the methods inside the interfaces. The methods actually used are Method AA 130, Method AB 131, Method AC 132, Method BA 133, Method BB 134 and Method BC 135.

When the code of the EXE 119 calls the function Method AA 130, the address 124 of the Method AA 130 written in the virtual address table is read first. At this address 124, the address of the code of the Method AA 130 created as a part of the Interface A 121 of the COM server is written. By calling this address, the code of the EXE 119 can call the Method AA 130 of the Interface A 121.

FIG. 7 shows the memory configuration of the information processor according to this embodiment. FIG. 7 is different from FIG. 6 in that a method call is mediated with the use of an approach referred to as VTable Patch (virtual address table patch) as a log acquisition code.

When acquisition of a log is started, a DLL 143 for VTable Patch is loaded into the RAM 3. This DLL rewrites the addresses of methods written in virtual address tables (136 and 138) with the addresses of a Method A'A 145, Method A'B 146, Method A'C 147, Method B'A 148, Method B'B 149 and Method B'C 150 which are log acquisition codes in a DLL. The codes of Method A'A 157, Method A'B 158, Method A'C 159, Method B'A 160, Method B'B 161 and Method B'C 162 in the DLL record a log and call a Method AA 157, Method AB 158, Method AC 159, Method BA 160, Method BB 161 and Method BC 162 which have been originally loaded onto the memory (RAM 3) to receive a method call.

FIG. 8 is a timing chart showing the VTable Patch processing in FIG. 7. This figure shows an example of how the log acquisition code operates in VTable Patch when an EXE 163 calls the Method AA of the Interface A in the COM sever, for simplification of the description. It goes without saying that similar processing is also performed in the case of other methods.

When an EXE 163 calls the Method AA (166), a log acquisition code in a DLL 164 stores the module name/interface name/method name, the time of the call, parameters at the time of the call, the content of the memory specified by a pointer parameter at the time of the call and other information in the memory (RAM 3) (167). After that, the DLL 164 calls the Method AA in a COM server 165, which is originally to be called (168). When Method AA processing (169) in the COM server ends and control is returned to the DLL 164 (170), the DLL 164 stores the time of the return in the memory, a return value into the memory (RAM 3), and then the content of the memory specified by the pointer parameter at the time of the return in the memory (RAM 3) (171). After that, the DLL 164 writes the stored log information in a file (172) and returns to the EXE 163 as if the Method AA in the COM server had ended normally (173).

Figure 9:
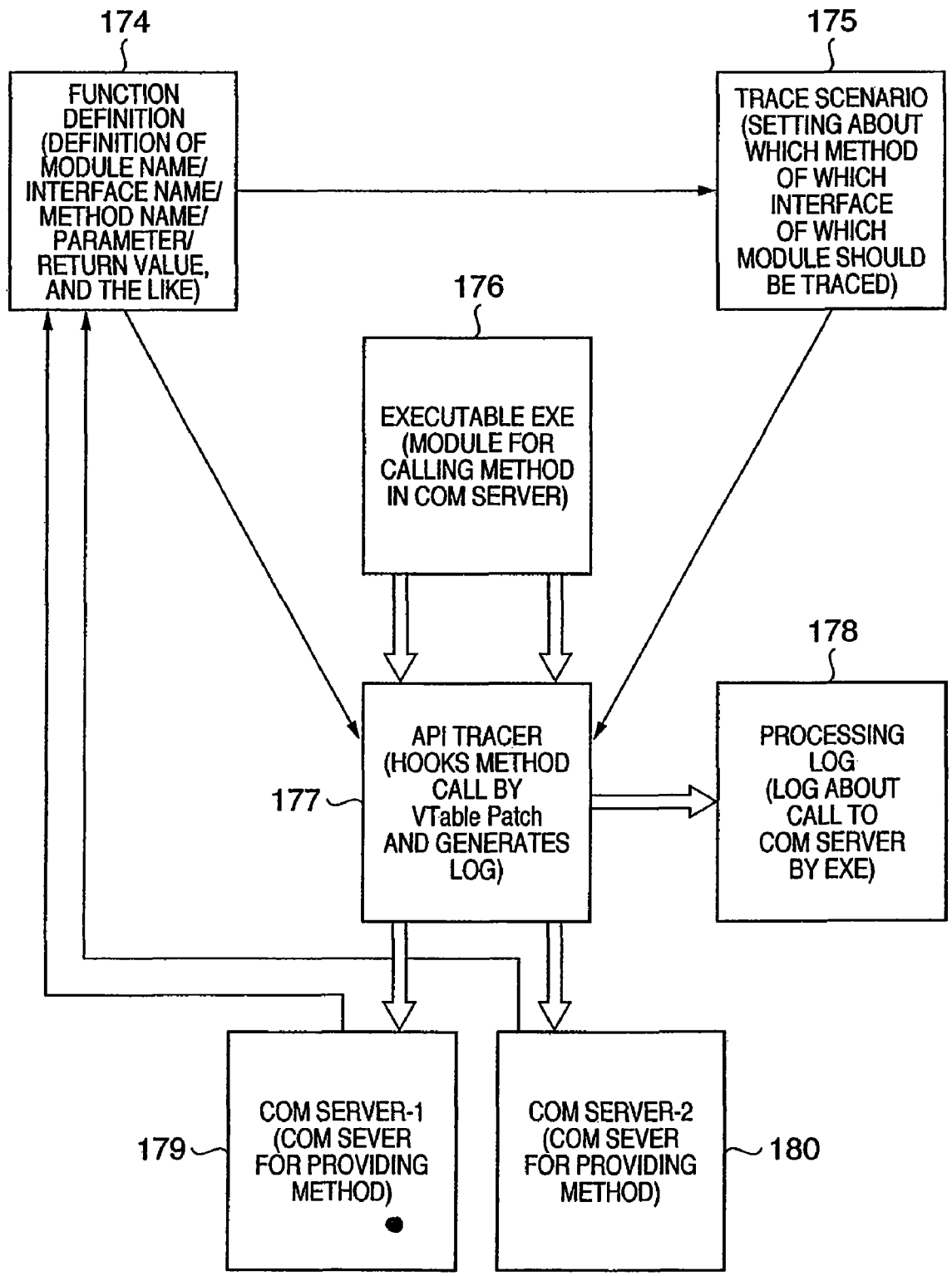
FIG. 9 shows an example of the operation performed when an executable file EXE is executed in the information processor according to the present embodiment.

FIG. 9 shows an example of the operation performed when an executable file EXE is executed in the information processor according to this embodiment. Usually, an execute form EXE 176 calls a method in a COM server 1 (179) or a COM server 2 (180). However, a log acquisition code called an API tracer is embedded (177) to generate a processing log (178) here. The API tracer operates based on a file in which definitions of functions are described (function definition file) 174 in the COM server 1 (179) or the COM server 2 and a setting scenario file 175 describing the virtual address table of which method of which interface in which COM server should be rewritten to acquire a log.

FIG. 10 shows an example of a function definition file to be used in the information processor according to this embodiment. In this example, definitions of functions are described in IDL (Interface Definition Language) which is commonly used. In the information processor according to this embodiment, a type library file in which this IDL is converted to tokens is used as the function definition file. A function definition file is characterized in providing definition for acquiring additional binary information (each log information), and definition of a function is not necessarily required to be written in IDL. For example, a common text file can be used, or a markup language such as XML can be also used.

<Color Determination on Output Data>

Next, description will be made on a configuration for making color determination on printer output data in the information processor according to this embodiment. Here, for simplification of the description, the case of sending a text drawing command to an image forming apparatus will be illustratively described. However, the configuration below can be applied to any graphic object. Further, though the configuration for acquiring a log about a drawing command outputted to a printer apparatus will be illustratively described below, the output target may be any apparatus.

FIG. 11 shows an example of a function definition file for making color determination on printer output data in the information processor according to this embodiment. In this embodiment, it is assumed that a dynamic link library file named OSGraphicKernel.dll is prepared in the operating system, and that TextOut 202 which is a function for performing text drawing, SetTextColor 204 which is a function for setting a text color, and GetTextColor 203 which is a function for acquiring a set text color are prepared in the library. Function names are not limited thereto. In the case of outputting a graphic object other than text, the function names are naturally different ones.

The function TextOut 202 inputs the handle of a device context, x and y coordinates at the drawing starting position, a character string to be drawn, and the number of character strings to be drawn as parameters and operates so as to issue a text drawing command to a particular target based on the inputted values. Then, it returns binary data indicating whether or not the operation has ended normally as a return value.

However, a device context is a handle to a "surface" virtualized by the operating system, and it specifies an apparatus to be targeted by drawing. In this embodiment, there are prepared a device context for the display 8 and a device context for a printer (not shown). For example, by selecting the handle of the device context for a printer (a first parameter of the TextOut function) and inputting other necessary parameters, a text drawing command can be issued to a printer. The device context is defined by typedef (200).

The function SetTextColor 204 is a function for setting a text color in drawing the text by calling the TextOut 202, and it is called and used before calling the TextOut 202 as described later. The SetTextColor 204 inputs the handle of a device context and a text color to be set, as parameters, sets the color information specified as the parameters, and returns color information set before the SetTextColor 204 was called as a return value.

The function GetTextColor 203 is a function for acquiring text color information which is set. The GetTextColor 203 inputs the handle of a device context as a parameter, acquires color information set for a device context corresponding to the inputted handle, and returns the value of the color information as a return value.

When the functions described above are called to output characters of a particular color to a printer, the following processing is performed. That is:

(1) A text color is set by the function SetTextColor 204; and (2) A text drawing instruction is given by the function The TextOut 202.

Figure 12:
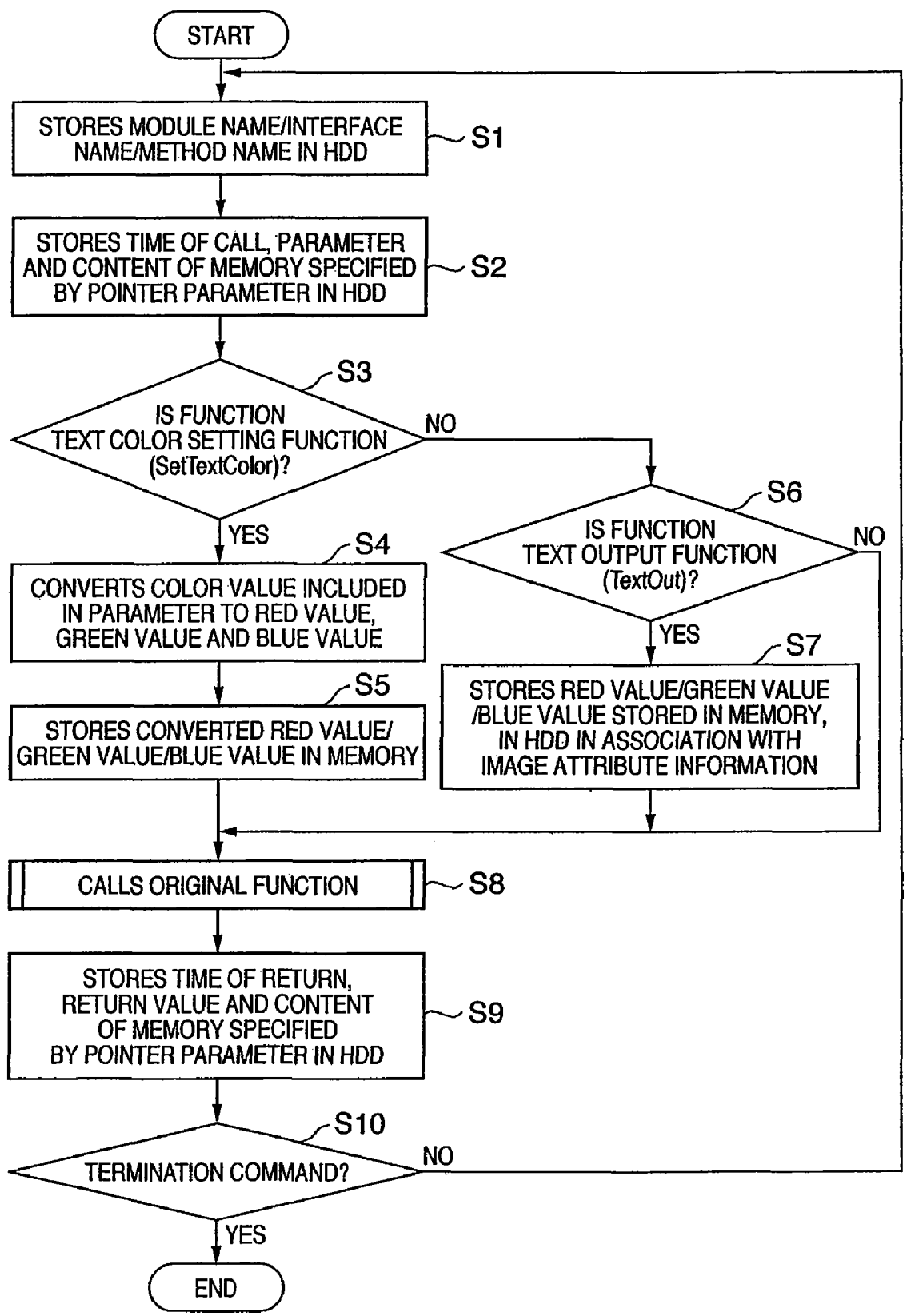
FIG. 12 is a flowchart showing the flow of processing for acquiring a log about the color of text in a first embodiment.

In consideration of the above procedure, description will be made on processing for acquiring, when application software issues a text drawing command to a device context corresponding a printer, a log about the color of the text with the use of IAT Patch, with reference to FIG. 12. FIG. 12 is a flowchart showing the flow of such processing. The processing below may be configured with VTable Patch described above.

When the application software starts a call to a function in the OSGraphicKernel.dll, the information processor according to this embodiment starts acquisition of a log. That is, the information processor creates a log writing file in the HDD 6, and at step S1, it acquires a module name, an interface name and a function/method name and adds them to the log writing file as a log. Then, at step S2, the information processor acquires the time of the function call, parameters and the content of the memory (RAM 3) specified by a pointer parameter and adds them to the log writing file as a log. As described above, information about the form of an image, such as the content of a character string, or information about the position of the image, such as the drawing position, is included in the parameters. This is not limited to the case where an image is related to text, and the same goes for the case of application to other graphic objects.

Next, different processing is performed according to the kind of the called function. That is, it is determined whether or not the called function is a text color setting function (SetTextColor) at step S3. If it is the text color setting function (step S3: YES), then the process proceeds to step S4. At step S4, the parameters of the function call are analyzed to acquire a parameter of a color to be set. Then, the acquired parameter of color is converted to a red value, a green value and a blue value. At step S5, control is performed to temporarily store each of the converted values in the RAM 3, and the process proceeds to step S8.

At step S8, OSGraphicKernel is accessed to actually call the function which the application software requested to call. In this case, the parameters of the function are set to the values sent by the application software. When a return occurs, the time of the return, a return value and the content of the memory specified by a pointer parameter are added to the log writing file as a log. Then, the process proceeds to step S10.

At step S10, it is determined whether or not termination has been instructed by the application software or a user. If termination has been instructed (step S10: YES), then the information processor terminates the processing. Otherwise (step S10: NO), the information processor returns to step S1 and continues the processing.

If the function called by the application software is not the text color setting function (step S3: NO), then the process proceeds to step S6, where it is determined whether or not the called function is a text output function (TextOut). If it is the text output function (step S6: YES), then the process proceeds to step S7. Otherwise (step S6: NO), then the process proceeds to step S8. The processing at and after step 8 is similar to that described above.

At step S7, the color information configured by the red value, the green value and the blue value, which has been temporarily stored at step S5, from the RAM 3, and they are added to the log writing file in the HDD 6 as a log in a manner that association with the other image attribute information (the time of the call, parameters (including information about the position or form of the image), the content of the memory specified by a pointer parameter, and the like) can be known. If the color information is not stored in the RAM 3, then error information is added to the log writing file as a log. Then, the process proceeds to step S8. The processing at and after step S8 is similar to that described above.

Figure 22:
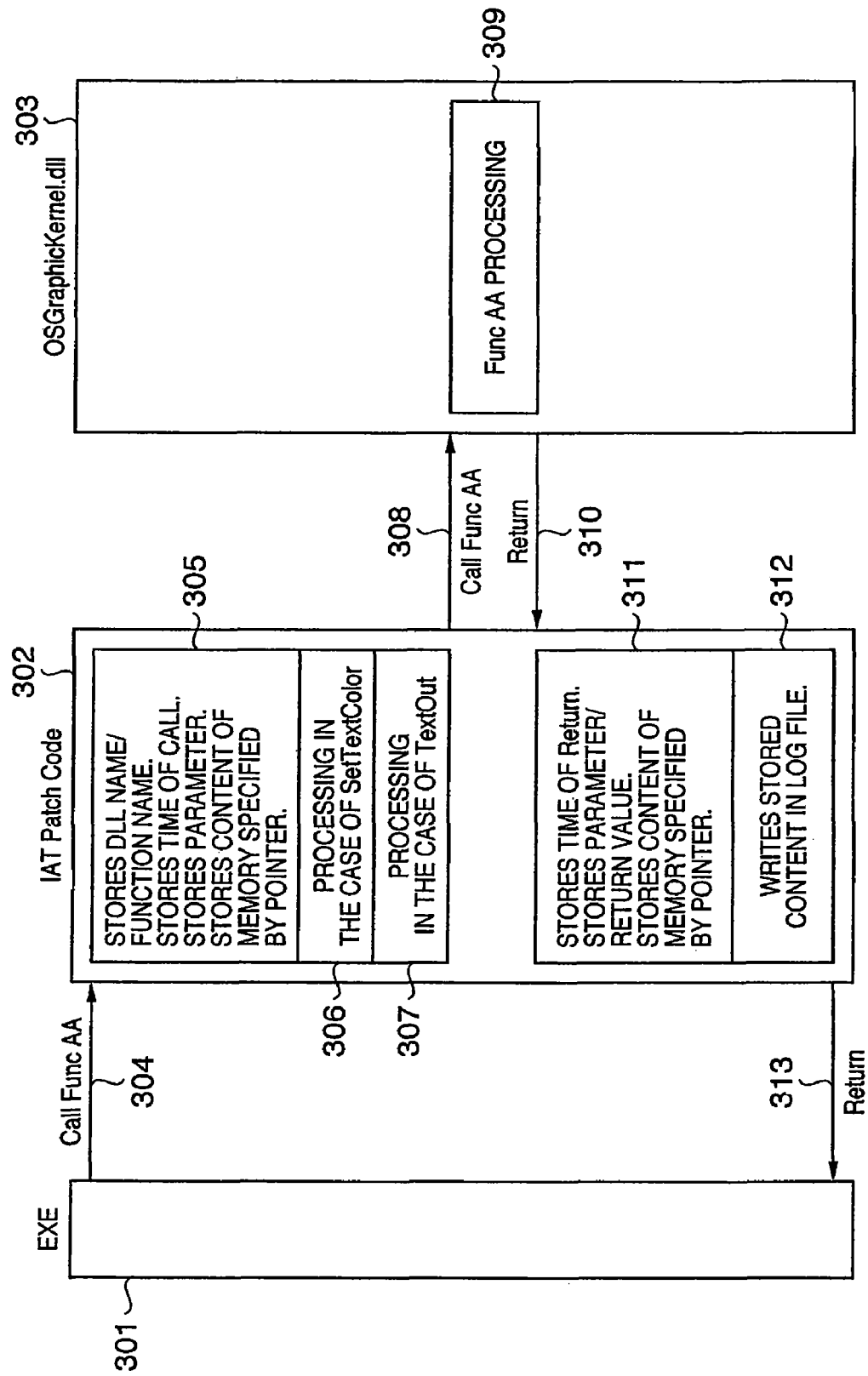
FIG. 22 is a timing chart in the case of acquiring a log about the color of text at the time of issuing a text drawing command, in the information processor according to the present embodiment.

Next, description will be made on association between the above processing and each component of the IAT Patch approach, with reference to FIG. 22. FIG. 22 shows a corresponding timing chart.

In FIG. 22, reference numerals 301, 302 and 313 denote an executable file EXE of the application software, a log acquisition code in IAT Patch (referred to as an IAT Patch code) and OSGraphicKernel, respectively.

When the EXE 301 calls a function, as described above, it makes the call not to an OSGraphicKernel.dll 303 but to an IAT Patch 302 (304). Receiving the function call, the IAT Patch 302 adds information such as a function name and the time of the call to the log writing file in the HDD 6 as a log (305). This processing corresponds to the processing through steps S1 and S2 in FIG. 12.

Then, the IAT Patch 302 determines the kind of the function for which the call request has been made and performs different predetermined processing in the case where the function is SetTextColor and in the case where it is TextOut. When the function is SetTextColor, the processing at step S4 and S5 in FIG. 12 is performed (306). When the function is TextOut, the processing at step S7 in FIG. 12 is performed (307).

Then, the function in the OSGraphicKernel.dll 303 for which the call request has been made is accessed (308), and the function is caused to execute predetermined processing (309). These processings correspond to step S8 in FIG. 12.

When a return occurs from the function in the OSGraphicKernel.dll 303 (310), information such as a return value and the time is added to the log writing file as a log (311 and 312). The processing corresponds to step S9 in FIG. 12. Then, a return is sent from the function in the OSGraphicKernel.dll 303 to the EXE 301.

Next, a log obtained as a result of the processing as above will be described with reference to FIG. 13. FIG. 13 illustratively shows log data to be acquired from the definition in FIG. 11 and the processing in FIGS. 12 and 22 in the information processor according to this embodiment. In FIG. 13, reference numerals 205 and 206 denote information about a color specified for a device context when the function TextOut is called, which makes it possible to easily grasp what color information an output request has been actually made based on, in chronological order. The color information is displayed in association with other image attribute information, and therefore, comparison between a printer output result and a log, for example, can be easily made.

As described above, by detecting color output with the use of IAT Patch, it can be apparently known, as for a failure caused in color output to a printer apparatus or the like, what instruction given by the application software to the operation system has caused the failure.

Furthermore, by determining a call to the text color setting function and the text output function and generating a log, in log acquisition with the use of IAT Patch, analysis of a log about color-related processing is facilitated. Furthermore, by generating a color information log in association with image attribute information, it is possible to detect a bug, for example, by comparing a printer output result with the position of a graphic object and color information in the log. Thereby, the cause of a bug can be easily identified in analyzing a log. Thus, it is possible to quickly identify the cause of a color-related failure.

[Second Embodiment]

In the first embodiment, description has been made on a configuration for selectively generating a log about a call to a color information setting function and a function for instructing output of a graphic object, in addition to the IAT Patch approach. In this embodiment, description will be made on a configuration for acquiring color information with the use of a text color acquisition function (GetTextColor) for acquiring set color information. The system configuration, OSGraphicKernel.dll and the like are similar to those of the first embodiment.

Figure 14:
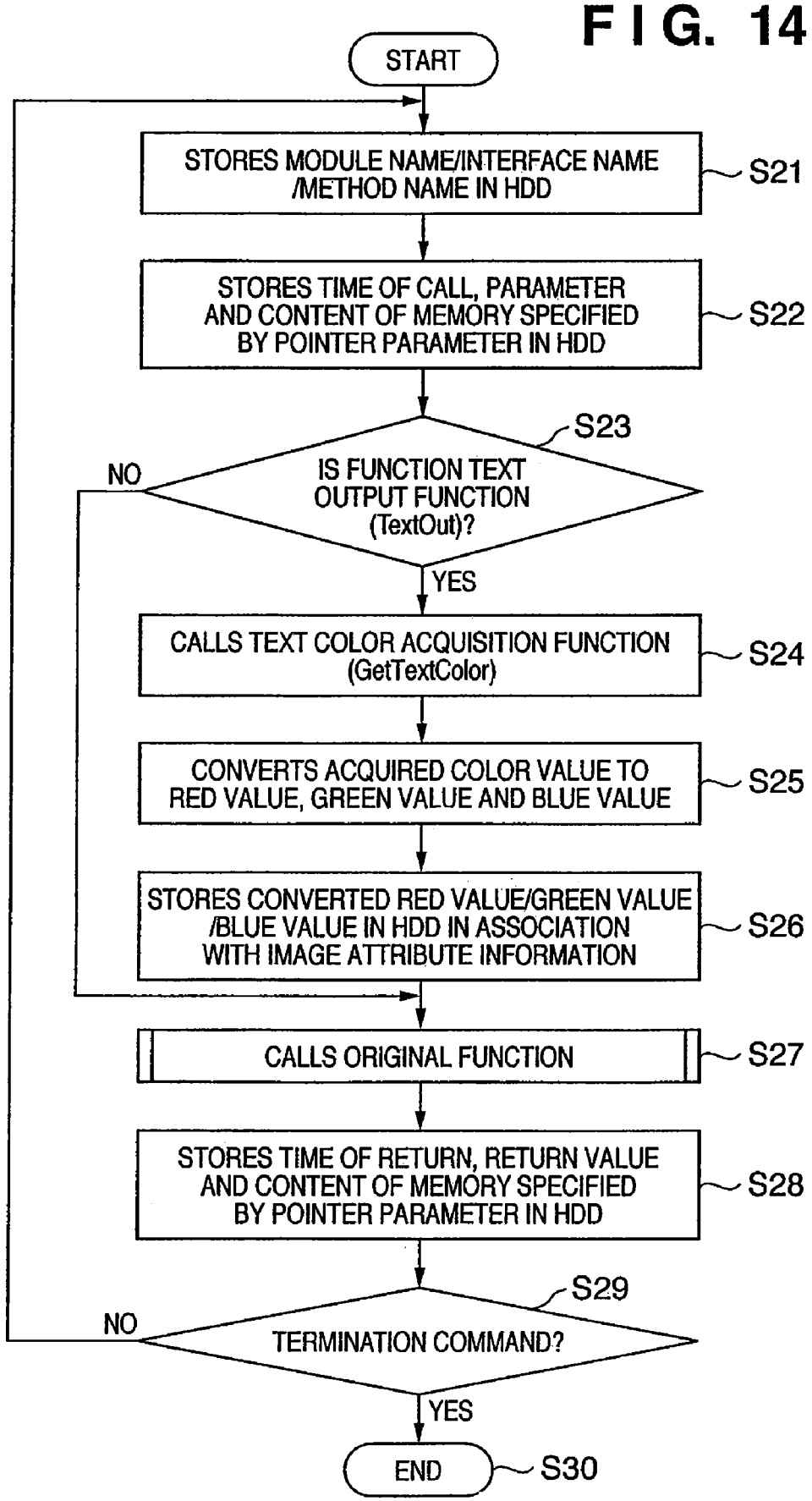
FIG. 14 is a flowchart showing the flow of processing for acquiring a log about the color of text in a second embodiment.

FIG. 14 is a flowchart showing the flow of processing for making color determination on printer output data in an information processor according to this embodiment. When application software starts a call to a function in OSGraphicKernel.dll, the information processor according to this embodiment starts acquisition of a log. That is, the information processor creates a log writing file in the HDD 6, and at step 21, it acquires a module name, an interface name and a function/method name, and adds the information to the log writing file as a log. Then, at step S22, the information processor acquires the time of the function call, parameters and the content of the memory (RAM 3) specified by a pointer parameter and adds them to the log writing file as a log. Then, the process proceeds to step S23.

In this embodiment, the processing through steps S23 to S26 is different from the processing shown in FIG. 1. That is, at step S23, the information processor determines whether or not the called function is a text output function (TextOut). If it is the text output function (step S23: YES), then the process proceeds to step S24. Otherwise (step S23: NO), the process proceeds to step S27. At step S24, the information processor calls a text color acquisition function (GetTextColor) in OSGraphicKernel.dll directly from the IAT Patch code to acquire set color information. Next, at step S25, the acquired color information is converted to a red value, a green value and a blue value. Then, at step S26, the red value, the green value and the blue value acquired at step S25 are added to the log writing file in the HDD 6 as a log in a manner that association with the other image attribute information (the time of the call, parameters (including information about the position or form of the image), the content of the memory specified by a pointer parameter, and the like) can be known. Since the processing at and after step S27 is similar to that at and after step 58 in FIG. 12, description thereof will be omitted.

Next, description will be made on a log obtained as a result of the above processing, with reference to FIG. 15. FIG. 15 illustratively shows log data to be acquired by the processing in FIG. 14, in the information processor according to this embodiment. In FIG. 15, reference numerals 207, 208 and 209 denote information about a color specified for a device context when the function TextOut is called, which makes it possible to easily grasp what color information an output request has been actually made based on, in chronological order, similar to the first embodiment.

As described above, in this embodiment, since a configuration in which the text color acquisition function is called from the IAT Patch code is employed, it is possible to output color data used for output of text when the text output function is called, as a log, without acquiring a log of a text color setting function. Thereby, it is possible to obtain an effect similar to that of the first embodiment while saving time required for generating a log and memory required for acquiring a log.

[Third Embodiment]

In the first and second embodiments, description has been made on the configuration in which a log is outputted for all calls to a function having a color output capability. However, it is conceivable that, for some purposes and applications, a log may not be necessary for all of such function calls. For example, there may be a case where it is desired to acquire a log only about output of a chromatic color image to identify the cause of a failure, in a system capable of executing both of output of a grayscale (achromatic color) image and output of a color (chromatic color) image. Therefore, in this embodiment, a configuration in which a log is acquired only about output of a chromatic color image will be illustratively described. The configuration below can also be applied to the case of acquiring a log only about output of an achromatic color image, for example. The system configuration, OSGraphicKernel.dll and the like are similar to those of the first embodiment.

Figure 16:
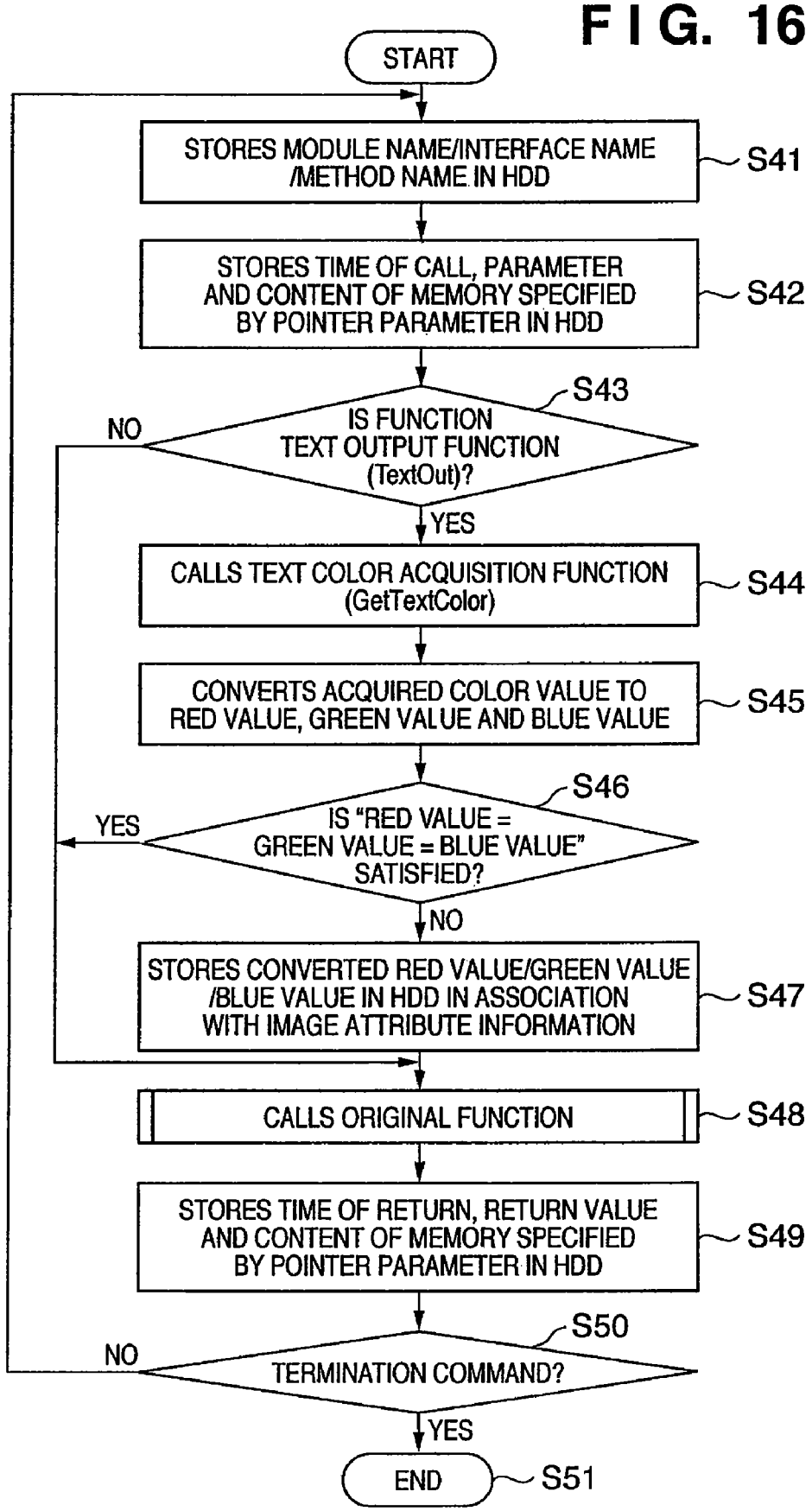
FIG. 16 is a flowchart showing the flow of processing for acquiring a log about the color of text in a third embodiment.

FIG. 16 is a flowchart showing the flow of processing for making color determination on printer output data in an information processor according to this embodiment. When application software starts a call to a function in OSGraphicKernel.dll, the information processor according to this embodiment starts acquisition of a log. That is, the information processor creates a log writing file in the HDD 6, and at step S41, it acquires a module name, an interface name and a function/method name at step S41 and adds the information to the log writing file as a log. Next, at step S42, the information processor acquires the time of the function call, parameters and the content of the memory (RAM 3) specified by a pointer parameter, and adds them to the log writing file as a log. Then, the process proceeds to step S43.

In this embodiment, the processing at steps S43 to S47 is different from the processing in FIG. 1. That is, the information processor determines whether or not the function called at step S43 is a text output function (TextOut). If it is the text output function (step S43: YES), then the process proceeds to step S44. Otherwise (step S43: NO), the process proceeds to step S48. At step S44, the information processor calls a text color acquisition function (GetTextColor) in OSGraphicKernel.dll directly from the IAT Patch code to acquire set color information. Next, at step S45, the acquired color information is converted to a red value, a green value and a blue value, and the process proceeds to step S46.

In this embodiment, the processing at steps S46 and S47 is different from the processing in FIG. 2. That is, at step S46, it is determined whether or not the color information acquired at step S44 indicates a chromatic color. If it is a chromatic color (step S46: NO), then the process proceeds to step S47. At step S47, the red value, the green value and the blue value acquired at step S45 are added to the log writing file in the HDD 6 as a log in a manner that association with the other image attribute information (the time of the call, parameters (including information about the position or form of the image), the content of the memory specified by a pointer parameter, and the like) can be known. If the color information does not indicate a chromatic color (step S46: YES), then the process proceeds to step S48. The determination about whether or not the color information indicates a chromatic color at step S46 is performed by determining whether or not "the red value=the green value=the blue value" is satisfied by the red value, the green value and the blue value acquired at step S45 (if satisfied, the color information indicates an achromatic color, and otherwise, it indicates a chromatic color). Since the processing at and after step S48 is similar to the processing at and after step S8 in FIG. 12, description thereof will be omitted.

Next, a log obtained as a result of the processing as above will be described with reference to FIG. 17. FIG. 17 illustratively shows log data to be acquired by the processing in FIG. 16, in the information processor according to this embodiment. In FIG. 17, reference numerals 210 and 211 denote information about a color specified for a device context when the function TextOut was called, and only a log in the case of a chromatic color is recorded. It is also possible to easily grasp what color information an output request has been actually made based on, in chronological order, similarly to the first and second embodiments.

As described above, in this embodiment, since the configuration is employed in which determination about whether a chromatic color or an achromatic color is implemented by the IAT Patch code, it is possible to output only chromatic color data as a log without acquiring a log about achromatic color data. Thereby, it is possible to acquire a log in which only necessary information is described while saving time required for generating a log, and therefore, it is possible to improve efficiency in failure discovery work.

[Fourth Embodiment]

In the first to third embodiments, the configuration for acquiring a log about text output has been illustratively described for simplification of the description. However, the above configuration can be applied to any graphic object. In this embodiment, description will be made on a configuration for acquiring a log bout output of a "pen" object as an example of a graphic object different from text. The pen object is a graphic object which is virtually provided for the operating system and used when drawing of a line is instructed to a device context.

FIG. 18 shows an example of a function definition file for making color determination on printer output data in the information processor according to this embodiment. In this embodiment, it is assumed that a dynamic link library file OSGraphicKernel.dll is prepared in the operating system. It is also assumed that functions including CreatePen 223, Select- Pen 224, SetStartPoint 225, LineTo 226, GetCurrentPenAttribute 227 and DeletePen 228 are prepared in the library.

The function CreatePen 223 is a function for generating a pen object. The CreatePen 223 receives color information about a pen object as a parameter, generates a pen object of the specified color, and returns the handle of the object as a return value. The function SelectPen 224 is a function for associating a pen object with a device context. The SelectPen 224 receives the handle of a device context and the handle of the pen object as parameters, associates the pen object with the specified device context, and returns a Boolean value indicating whether or not the association has succeeded, as a return value.

The functions SetStartPoint 225 and LineTo 226 are functions for performing drawing with the use of a pen object. The SetStartPoint 225 receives the handle of a device context and coordinates (x and y coordinates) of the drawing starting position as parameters, and sets coordinates of the starting position of a line. The LineTo 226 receives the handle of a device context and coordinates (x and y coordinates) of the drawing ending position as parameters, sets coordinates of the ending position of a line, and instructs output of a line connecting the starting position and the ending position for which the coordinates have been set. The color of the line outputted then is the value set as the parameter of the Create-Pen 223.

The function GetCurrentPenAttribute 227 is a function for acquiring color information set for a pen object. The GetCurrentPenAttribute 227 inputs the handle of a device context and a pointer to color information about a pen object as parameters, and acquires the color of the pen object. Then, it sets a pointer to the color information to enable access to the acquired color information, and returns a Boolean value indicating whether or not acquisition of the color information has succeeded, as a return value.

The function DeletePen 228 is a function for deleting a pen object. The DeletePen 228 inputs the handle to a pen object as a parameter and deletes the pen object specified by the handle from the memory.

The following processing is performed to output a line of a particular color. That is:

(1) Creates a pen object of a particular color by the CreatePen function;

(2) Associates the pen object with a device context, which is a virtualized printer apparatus, by the SelectPen function;

(3) Sets drawing starting position coordinates by the SetStartPoint function.

Figure 19:
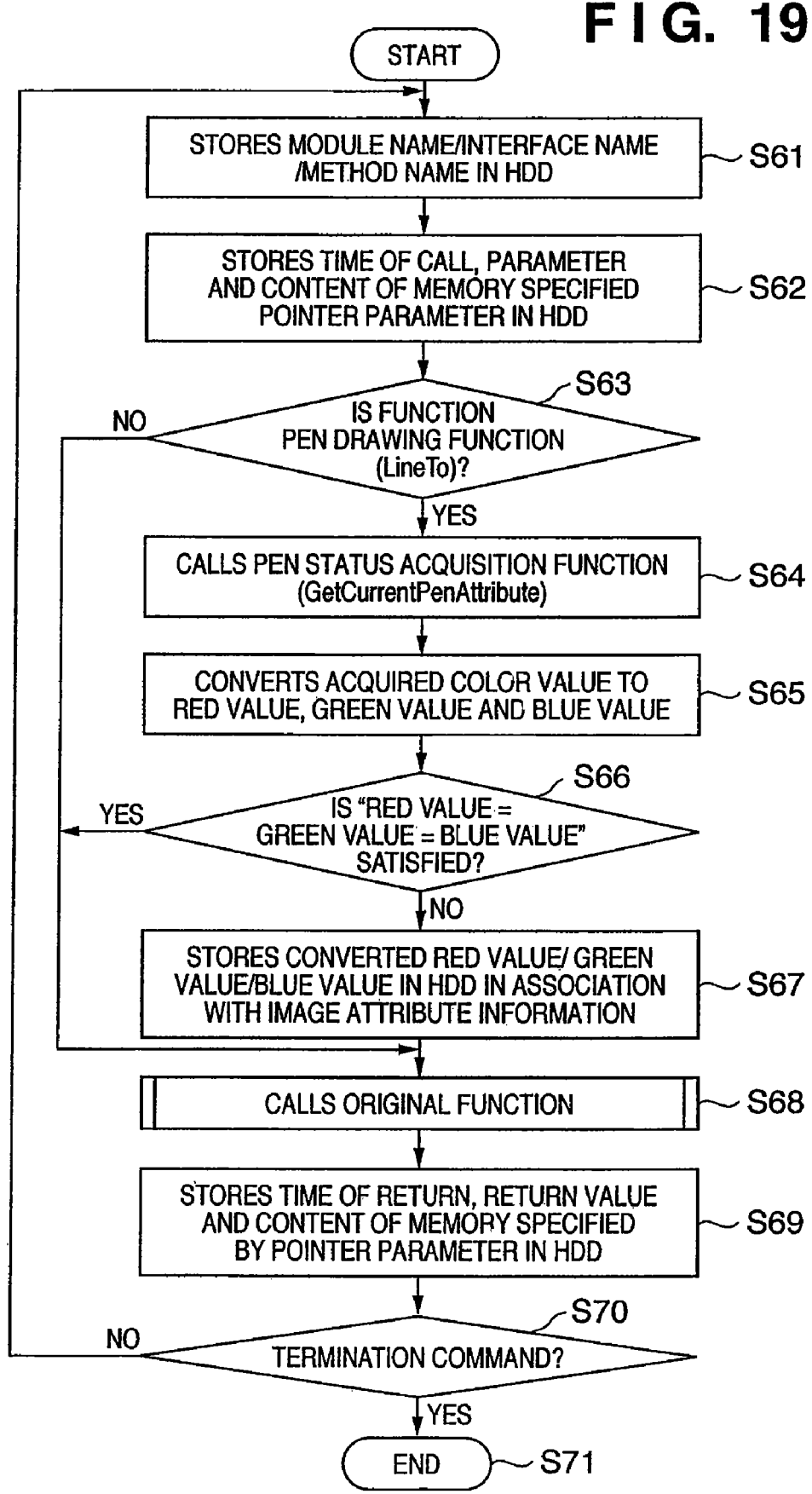
FIG. 19 is a flowchart showing the flow of processing for acquiring a log about the color of a pen object in the fourth embodiment.

(4) Specifies drawing ending coordinates, that is, specifies to which coordinates a line should be drawn by the pen object associated with the device context, and instructs drawing; and (5) Deletes the pen object by the DeletePen function;

In consideration of this procedure, description will be made on processing for acquiring, when application software issues an instruction to draw a pen object to a device context corresponding to a printer apparatus, a log about the color of the pen object with the use of IAT Patch, with reference to FIG. 19. FIG. 19 is a flowchart showing the flow of such processing. However, the processing below may be configured with the use of VTable Patch described above. In this example, description will be made on the case of acquiring a log about a chromatic color output instruction, similarly to the third embodiment.

When the application software starts a call to a function in OSGraphicKernel.dll, the information processor according to this embodiment starts acquisition of a log. That is, the information processor creates a log writing file in the HDD 6, acquires a module name, an interface name and a function/method name at step S61, and adds the information to the log writing file as a log. Then, at step S62, the information processor acquires the time of the function call, parameters and the content of the memory (RAM 3) specified by a pointer parameter, and adds them to the log writing file as a log. As described above, information about the form of an image, such as the content of a character string, or information about the position of the image, such as the drawing position, is included in the parameters. This is not limited to the case of an image related to a pen object, and the same goes for the case of application to other graphic objects.

At step S63, it is determined whether or not the called function is the pen drawing function (LineTo). If it is the pen drawing function (step S63: YES), then the proceeds to S64. Otherwise (step S63: NO), the process proceeds to S68.

At step S64, the pen status acquisition function (GetCurrentPenAttribute) is internally called from the IAT Patch code to acquire color information set for the pen object. Then, at step S65, the acquired color information is converted to a red value, a green value and a blue value.

Next, at step S66, it is determined whether or not the acquired color information indicates a chromatic color. If it indicates a chromatic color (step S66: NO), then the process proceeds to step S67. At step S67, the red Value, the green value and the blue value acquired at step 565 are added to the log writing file in the HDD 6 as a log in a manner that association with the other image attribute information (the time of the call, parameters (including information about the position or form of the image), the content of the memory specified by a pointer parameter, and the like) can be known. If the color information does not indicate a chromatic color (step S66: YES), then the process proceeds to step S68. The determination about whether or not the color information indicates a chromatic color at step S66 is performed by determining whether or not "the red value=the green value=the blue value" is satisfied by the red value, the green value and the blue value acquired at step S65 (if satisfied, the color information indicates an achromatic color, and otherwise, it indicates a chromatic color). Since the processing at and after step S68 is similar to the processing at and after step S8 in FIG. 12, description thereof will be omitted.

Next, description will be made on a log obtained as a result of the above processing, with reference to FIG. 20. FIG. 20 illustratively shows log data to be acquired by the processing in FIG. 19, in the information processor according to this embodiment. In FIG. 20, reference numerals 212 and 213 denote information about the color specified for a device context when the function LineTo is called, and a log only in the case of a chromatic color is recorded therein. It is also possible to easily grasp what color information an output request has been actually made based on, in chronological order, similarly to the first to third embodiments.

As described above, in this embodiment, by acquiring color information at the timing of instructing output of a graphic object and recording it in a log, a log can be also acquired about a pen object which is one of graphic objects.

In this embodiment, description has been made on a pen object as an example. However, this embodiment is effective for any graphic object. For example in the case where a brush object and a bitmap object are prepared as graphic objects provided by the operating system, it is possible to, by performing the same processing for all the graphic objects, acquire all information about what color the application has instructed the operating system to instruct a printer apparatus to perform drawing with, into a log file, with the user of the IAT Patch/VTable Patch technique. Thereby, it is possible to quickly identify the cause of a color-related failure.

[Fifth Embodiment]

In the first to fourth embodiments, the configuration in which a log is outputted with the use of IAT Patch/VTable Patch has been described. In this embodiment, description will be made on a user interface (UI) for displaying records having a color field, being expressly separated from other records so that an outputted log can be easily analyzed.

FIG. 21 is an example of a log display user interface in the information processor according to this embodiment. In this user interface, a record having a color information field is highlighted. In the example in FIG. 21, such a record is indicated by attaching a mark thereto as shown under a title space 230. A record is log information outputted in response to each function call. Thus, it is possible to quickly identify a record with a color information field. A not by setting a mark but by setting the color of text or a text background to a color different from the color of text or a text background of records without a color information field. A record may be highlighted not only based on with or without a color information field. For example, a record for a particular function or module, or a record at a time satisfying a particular condition may be highlighted.

The title space 230 is provided as a button to provide a function of sorting fields with a mark and fields without the mark when the button is pressed. A function of selecting only fields with a mark may be also provided. Furthermore, a module name, a function/method name, the time of a call, the time of a return and the like are displayed as shown in title spaces 231, 232, 233 and 234. Furthermore, each of the title spaces 231, 232, 233 and 234 is provided as a button to provide a function of sorting records based on the value of the item in the title space-when the button is pressed.

Furthermore, a search menu or search shortcut key not shown is provided to provide a function of searching for a log item corresponding to a desired keyword.

By employing the configuration for displaying a log, it is possible to improve efficiency in failure discovery work.

Figure 23:
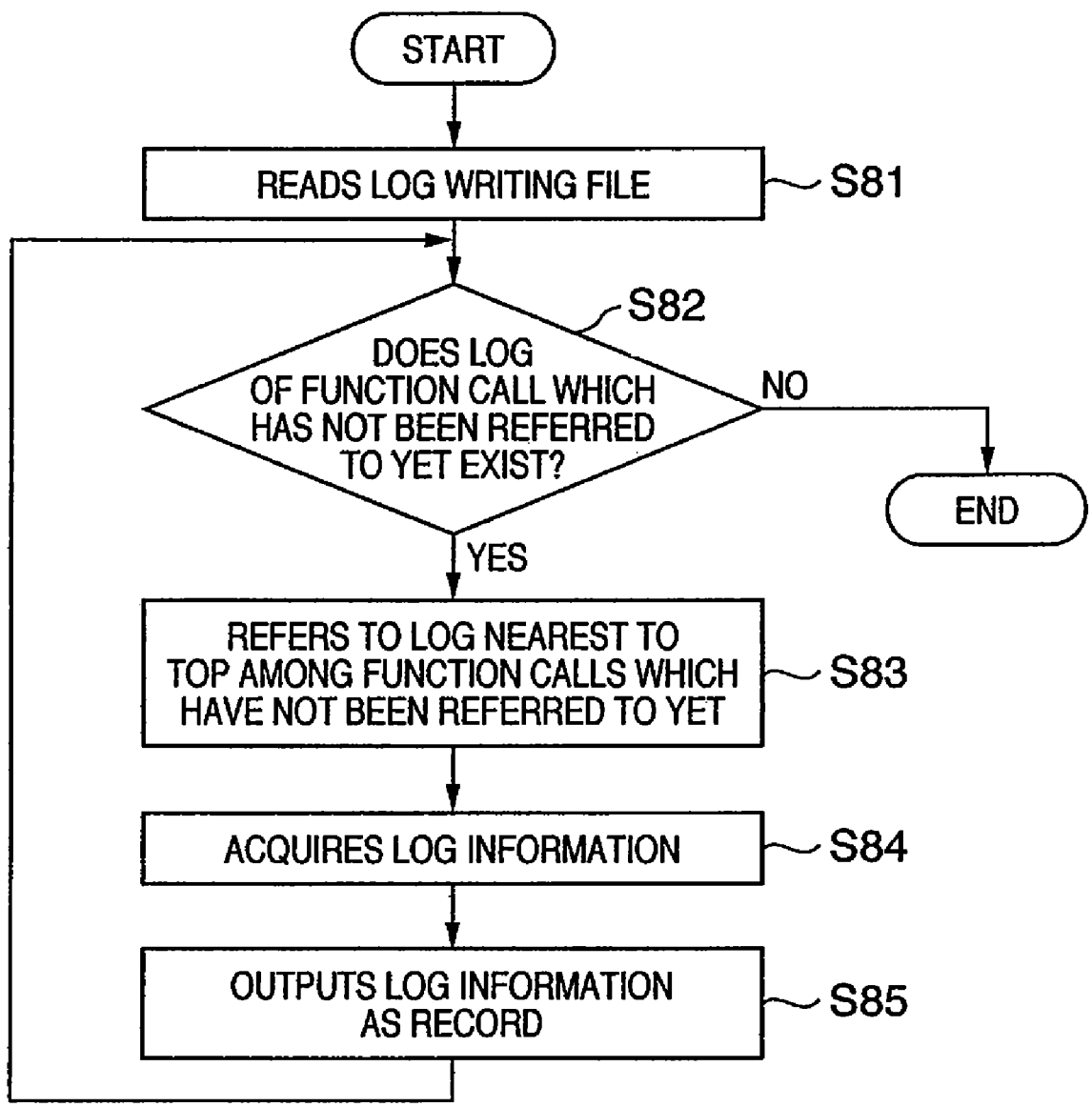
FIG. 23 is a flowchart showing processing for generating a record from a log writing file in the fifth embodiment.

Description will be made on processing for generating a record from a log writing file with reference to the flowchart in FIG. 23.

First, at step S81, control is performed to temporarily store a log writing file in a memory (such as the RAM 3). Next, at step S82, the log writing file stored in the memory is referred to from the top to determine whether or not a log corresponding to a function call exists, which has not been referred to yet. If there is any such a log (step S82: YES), the process proceeds to step S83. Otherwise (step S82: NO), the information processor terminates the processing.

At step S83, a log nearest to the top is referred to among logs which correspond to the function call and have not been referred to yet. Then, the log information referred to at step S84 is acquired, and the acquired log information is outputted as a record at step S85. By repeatedly executing the processing through steps S82 to S85, all the records can be generated from the log writing file.

Each record may be outputted as a separate file, or all the records may be outputted being integrated in one file. Based on records generated in this way, the information processor according to this embodiment provides a user interface as described above.

[Other Embodiments]

Embodiments of the present invention have been described above. However, the present invention can be embodied as a system, an apparatus, a method, a program or a storage medium, for example. Specifically, the present invention may be applied to a system configured by multiple pieces of equipment or may be applied to an apparatus configured by one piece of equipment.

There is also included a case in which the present invention is achieved by providing a program for realizing the functions of the above-described embodiments for a system or an apparatus directly or remotely and then a computer of the system or the apparatus reading and executing the provided program code.

Accordingly, since the functions and processings of the present invention are realized by the computer, the program code itself to be installed in the computer is included in the technical scope of the present invention. That is, the present invention also includes the computer program itself for realizing the functions and processings of the present invention.

In this case, the form may be an object code, a program to be executed by an interpreter, script data to be provided for OS or the like only if it is provided with functions as a program.

As a recording medium for providing the program, there are, for example, a floppy (registered trademark) disk, hard disk, optical disk, magneto-optical disk, MO, CD-ROM, CD-R, CD-RW, magnetic tape, non-volatile memory card, ROM, DVD (DVD-ROM and DVD-R) and the like.

In addition, as a method for providing the program, it is also possible to connect a web page on the Internet with the use of a browser of a client computer and download the computer program itself of the present invention or a compressed file including an automatic installation function from the web page to a recording medium such as a hard disk to provide the program. Furthermore, provision can be also realized by downloading respective multiple files into which the program codes configuring the program of the present invention have been divided, from different web pages. That is, a WWW server for causing multiple users to download a program file for realizing the functions and processings of the present invention by a computer is also included in the present invention.

Furthermore, provision can be also realized by encrypting the program of the present invention, storing it in a storage medium such as a CD-ROM, distributing it to users, and causing a user who clears a predetermined condition to download key information for decryption from a web page via the Internet and execute the encrypted program using the key information to install it in a computer. The functions of the above-described embodiments are realized not only by a computer executing the read program but also by the OS, which is operating on the computer, performing a part or all of the actual processing based on the instructions of the program.

Furthermore, the functions of the above-described embodiments can be also realized by the CPU, which is provided for a feature expansion board inserted in a computer or a feature expansion unit connected to the computer, performing a part or all of the actual processing based on instructions of the program which has been read from a recording medium and written in the memory provided for the feature expansion board or the feature expansion unit.

As described above, according to the present invention, it is possible to provide a technique which makes it possible to easily analyze a processing log especially of software handling color data.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-106800, filed Apr. 1, 2005, which is hereby incorporated by reference herein in its entirety.

What is claimed is:

1. A method for controlling an information processor for executing first and second modules and a third module for mediating a call from the first module to a function in the second module and acquiring a processing log of the second module which responds to the call, the method comprising:
   a function determination step of determining whether or not a function of the second module called by the first module is an image output function for instructing output of a predetermined image;
   an acquisition step of acquiring color information specifying a color to be used by the image output function for outputting the predetermined image, if the called function is determined to be the image output function, store the color information in a storage unit
   a color information determination step of determining whether or not the color information indicates a chromatic color; and
   a recording step of recording the color information in association with image attribute information about the predetermined image as the processing log, if the color information is determined to indicate a chromatic color, and refraining from recording the color information if the color information is not determined to indicate the chromatic color.

2. The method for controlling an information processor according to claim 1, wherein the image attribute information includes at least any of the time of the call to the image output function, information about the form of the predetermined image, information about the position of the predetermined image, the time of return of a return value by the second module in response to the call to the image output function, the return value, and whether color information is included.

3. The method for controlling an information processor according to claim 2, further comprising:
   a record generation step of dividing the processing log recorded in the recording step and generating the processing log recorded in response to each call to the image output function, as a record;
   a display step of displaying the records generated in the record generation step for each kind of the image attribute information as a list;
   a selection acceptance step of accepting a selection, from a user, of a kind of the image attribute information to be a criterion for sorting the records; and
   a sorting step of sorting the content of records generated in the record generation step for the kind of the image attribute information corresponding to the selection accepted in the selection acceptance step.

4. The method for controlling an information processor according to claim 3, wherein the content of the records, which satisfies a predetermined condition, are highlighted in the display step.

5. A computer program for causing a computer to perform the method for controlling an information processor according to claim 1.

6. A computer-readable storage medium in which the computer program according to claim 5 is stored.

7. An information processor for executing first and second modules and a third module for mediating a call from the first module to a function in the second module and acquiring a processing log of the second module which responds to the call, the third module comprising:
   a function determination unit adapted to determine whether or not a function of the second module called by the first module is an image output function for instructing output of a predetermined image;
   an acquisition unit adapted to acquire color information specifying a color to be used by the image output function for outputting the predetermined image, if the called function is determined to be the image output function;
   a color information determination unit adapted to determine whether or not the color information indicates a chromatic color; and
   a recording unit adapted to record the color information in association with image attribute information about the predetermined image as the processing log, if the color information is determined to indicate a chromatic color, and adapted to refrain from recording the color information if the color information is not determined to indicate the chromatic color.

8. The information processor according to claim 7, wherein the image attribute information includes at least any of the time of the call to the image output function, information about the shape of the predetermined image, information about the position of the predetermined image, the time of return of a return value by the second module in response to the call to the image output function, the return value, and whether color information is included.

9. The information processor according to claim 8, further comprising:
   a record generation unit adapted to divide the processing log recorded by the recording unit and generate the processing log recorded in response to each call to the image output function, as a record;
   a display unit adapted to display the records generated by the record generation unit for each kind of the image attribute information as a list;
   a selection acceptance unit adapted to accept a selection, from a user, of a kind of the image attribute information to be a criterion for sorting the records; and
   a sorting unit adapted to sort the content of records generated by the record generation unit for the kind of the image attribute information corresponding to the selection accepted by the selection acceptance unit.

10. The information processor according to claim 9, wherein the display unit highlights the content of the records which satisfies a predetermined condition.

* * * * *